United States Patent
Da Silva et al.

(10) Patent No.: US 12,096,295 B2
(45) Date of Patent: Sep. 17, 2024

(54) METHODS FOR CANCELLING OR UPDATE OF CONDITIONAL MOBILITY PROCEDURES

(71) Applicant: Telefonaktiebolaget LM Ericsson (publ), Stockholm (SE)

(72) Inventors: Icaro L. J. Da Silva, Solna (SE); Julien Muller, Rennes (FR); Sofia Ek, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 421 days.

(21) Appl. No.: 17/298,779

(22) PCT Filed: Dec. 5, 2019

(86) PCT No.: PCT/SE2019/051236
§ 371 (c)(1),
(2) Date: Jun. 1, 2021

(87) PCT Pub. No.: WO2020/117121
PCT Pub. Date: Jun. 11, 2020

(65) Prior Publication Data
US 2022/0038975 A1 Feb. 3, 2022

Related U.S. Application Data

(60) Provisional application No. 62/775,962, filed on Dec. 6, 2018.

(51) Int. Cl.
*H04W 36/08* (2009.01)
*H04W 36/00* (2009.01)

(52) U.S. Cl.
CPC ..... *H04W 36/08* (2013.01); *H04W 36/00837* (2018.08)

(58) Field of Classification Search
None
See application file for complete search history.

(56) References Cited

U.S. PATENT DOCUMENTS

| | | | |
|---|---|---|---|
| 2015/0334607 A1* | 11/2015 | Singh | H04W 36/0079 455/437 |
| 2017/0026960 A1 | 1/2017 | Mestanov et al. | |
| 2021/0377830 A1* | 12/2021 | Jin | H04W 4/44 |

OTHER PUBLICATIONS

"3GPP TS 33.401 V15.5.0", 3rd Generation Partnership Project; Technical Specification Group Services and System Aspects; 3GPP System Architecture Evolution (SAE); Security architecture (Release 15), Sep. 2018, pp. 1-163.

(Continued)

*Primary Examiner* — Hong Shao
(74) *Attorney, Agent, or Firm* — Murphy, Bilak & Homiller, PLLC

(57) ABSTRACT

Methods performed by a first node in a radio access network (RAN) for mobility of a user equipment (UE) served by a second node in the RAN. Such methods include receiving (1310), from the second node, a request for a mobility procedure for the UE towards at least one candidate target cell associated with the first node. Such methods include determining (1320) if the UE can be accepted for the requested mobility procedure and, if so, allocating resources to support mobility of the UE. Such methods include transmitting (1330), to the second node, a response that includes a configuration for the mobility procedure and indicates the UE can be accepted unless a cancelling message is subsequently received from the second node. Such methods include determining (1350) that the configuration is no longer valid, and transmitting (1360), to the second node, an indication that the configuration is no longer valid.

17 Claims, 19 Drawing Sheets

(56) References Cited

OTHER PUBLICATIONS

"3GPP TS 38.401 V15.3.0", 3rd Generation Partnership Project; Technical Specification Group Radio Access Network; NG-RAN; Architecture description (Release 15), Sep. 2018, pp. 1-39.
"3GPP TS 38.420 V15.1.0", 3rd Generation Partnership Project; Technical Specification Group Radio Access Network; NG-RAN; Xn general aspects and principles (Release 15), Sep. 2018, pp. 1-14.
"3GPP TS 38.423 V15.1.0", 3rd Generation Partnership Project; Technical Specification Group Radio Access Network; NG-RAN; Xn application protocol (XnAP) (Release 15), Sep. 2018, pp. 1-263.
"3GPP TS 38.473 V15.3.0", 3rd Generation Partnership Project; Technical Specification Group Radio Access Network; NG-RAN; F1 application protocol (F1AP) (Release 15), Sep. 2018, pp. 1-176.
"Conditional Handover—HO modification", 3GPP TSG-RAN WG3 Meeting #104; R3-194304; Ljubljana, Slovenia, Aug. 26-30, 2019, pp. 1-15.
"Conditional handover in LTE", 3GPP TSG RAN WG2 #104; R2-1817399; Spokane, US, Nov. 12-16, 2018, pp. 1-5.
"Discussion of conditional handover", 3GPP TSG RAN WG2 Meeting #104; R2-1816691; Revision of R2-1814051; Spokane, USA, Nov. 8-12, 2018, pp. 1-4.
"Handover Modification Procedure in CHO", 3GPP TSG-RAN WG3 Meeting#105bis; R3-195488; Chongqing, China, Oct. 14-18, 2019, pp. 1-2.
"3GPP TS 36.331 V15.3.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2018, pp. 1-918.
"3GPP TS 38.300 V15.3.1", 3rd Generation Partnership Project; Technical Specification Group Radio Access Network; NR; NR and NG-RAN Overall Description; Stage 2 (Release 15), Oct. 2018, pp. 1-92.
"3GPP TS 38.331 V15.3.0", 3rd Generation Partnership Project; Technical Specification Group Radio Access Network; NR; Radio Resource Control (RRC) protocol specification (Release 15), Sep. 2018, pp. 1-445.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"3GPP TS 33.501 V15.2.0", 3rd Generation Partnership Project; Technical Specification Group Services and System Aspects; Security architecture and procedures for 5G system (Release 15), Sep. 2018, pp. 1-175.
"3GPP TS 23.501 V15.3.0", 3rd Generation Partnership Project; Technical Specification Group Services and System Aspects; System Architecture for the 5G System; Stage 2 (Release 15), Sep. 2018, pp. 1-226.
"Analysis on conditional handover", 3GPP TSG-RAN WG2 #97bis, R2-1703384, Spokane, USA, Apr. 3-7, 2017, pp. 1-7.
"Correcting presence of New eNB UE X2AP ID IE within Handover Cancel", 3GPP TSG-RAN WG3 Meeting #61, R3-081896, Jeju Island, Korea, Aug. 18-22, 2008, pp. 1-3.
"HO Cancel msg received after UE has accessed the target eNB should be ignored", 3GPP TSG-RAN WG3 #73bis, R3-112616, Zhuhai, China, Oct. 10-14, 2011, pp. 1-2.
"Configuration Management for Conditional Handover", 3GPP TSG-RAN WG2 Meeting #101, R2-1803347, Athens, Greece, Feb. 26-Mar. 2, 2018, Feb. 26-Mar. 2, 2018, pp. 1-3.

* cited by examiner

```
-- ASN1START
-- TAG-HANDOVER-PREPARATION-INFORMATION-START
HandoverPreparationInformation ::=   SEQUENCE {
    criticalExtensions                  CHOICE {
        c1                                  CHOICE{
            handoverPreparationInformation      HandoverPreparationInformation-IEs,
            spare3 NULL, spare2 NULL, spare1 NULL
        },
        criticalExtensionsFuture            SEQUENCE {}
    }
}
HandoverPreparationInformation-IEs ::= SEQUENCE {
    ue-CapabilityRAT-List               UE-CapabilityRAT-ContainerList,
    sourceConfig                        AS-Config         OPTIONAL, -- Cond HO
    rrm-Config                          RRM-Config                   OPTIONAL,
    as-Context                          AS-Context                   OPTIONAL,
    nonCriticalExtension                SEQUENCE {}                  OPTIONAL
}
AS-Config ::=                       SEQUENCE {
    rrcReconfiguration                  OCTET STRING (CONTAINING RRCReconfiguration),
    ...
}
AS-Context ::=                      SEQUENCE {
    reestablishmentInfo                 ReestablishmentInfo     OPTIONAL,
    configRestrictInfo                  ConfigRestrictInfoSCG   OPTIONAL,
    ...,
    [[  ran-NotificationAreaInfo        RAN-NotificationAreaInfo OPTIONAL    ]]
}
ReestablishmentInfo ::=             SEQUENCE {
    sourcePhysCellId                    PhysCellId,
    targetCellShortMAC-I                ShortMAC-I,
    additionalReestabInfoList           ReestabNCellInfoList    OPTIONAL
}
ReestabNCellInfoList ::=        SEQUENCE (SIZE (1..maxCellPrep)) OF ReestabNCellInfo
ReestabNCellInfo::=                 SEQUENCE{
    cellIdentity                        CellIdentity,
    key-gNodeB-Star                     BIT STRING (SIZE (256)),
    shortMAC-I                          ShortMAC-I
}
RRM-Config ::=                      SEQUENCE {
    ue-InactiveTime                     ENUMERATED {
                                            s1, s2, s3, s5, s7, s10, s15, s20, s25, s30,
                                            s40, s50, min1, min1s20c, min1s40,min2, min2s30,
                                            min3, min3s30, min4, min5, min6, min7, min8,
                                            min9, min10, min12, min14, min17, min20, min24,
                                            min28, min33, min38, min44, min50, hr1,
                                            hr1min30, hr2, hr2min30, hr3, hr3min30, hr4, hr5,
                                            hr6, hr8, hr10, hr13, hr16, hr20, day1, day1hr12,
                                            day2, day2hr12, day3, day4, day5, day7, day10,
                                            day14, day19, day24, day30, dayMoreThan30 }
                                                                OPTIONAL,
    candidateCellInfoList           MeasResultList2NR           OPTIONAL,
    ...
}
-- TAG-HANDOVER-PREPARATION-INFORMATION-STOP
-- ASN1STOP
```

FIG. 6A

| Field or indicator | Description |
|---|---|
| as-Context | Local RAN context required by the target gNB. |
| sourceConfig | The radio resource configuration as used in the source cell. |
| rrm-Config | Local RAN context used mainly for RRM purposes. |
| ue-CapabilityRAT-List | The UE radio access related capabilities concerning RATs supported by the UE. FFS whether certain capabilities are mandatory to provide by source e.g. of target and/or source RAT. |
| HO | Indicates that a field is mandatory present in case of handover within NR; The field is optionally present in case of handover from E-UTRA connected to 5GC; otherwise the field is not present. |
| candidateCellInfoList | A list of the best cells on each frequency for which measurement information was available |

| Source RAT | NR capabilites | E-UTRA capabilities | MR-DC capabilities |
|---|---|---|---|
| NR | Included | May be included | May be included |
| E-UTRAN | Included | May be included | May be included |

FIG. 6B

```
-- ASN1START
-- TAG-HANDOVER-COMMAND-START

HandoverCommand ::=            SEQUENCE {
    criticalExtensions             CHOICE {
        c1                             CHOICE{
            handoverCommand                HandoverCommand-IEs,
            spare3 NULL, spare2 NULL, spare1 NULL
        },
        criticalExtensionsFuture       SEQUENCE {}
    }
}

HandoverCommand-IEs ::=        SEQUENCE {
    handoverCommandMessage         OCTET STRING (CONTAINING RRCReconfiguration),
    nonCriticalExtension           SEQUENCE {}                             OPTIONAL
}
-- TAG-HANDOVER-COMMAND-STOP
-- ASN1STOP
```

FIG. 7

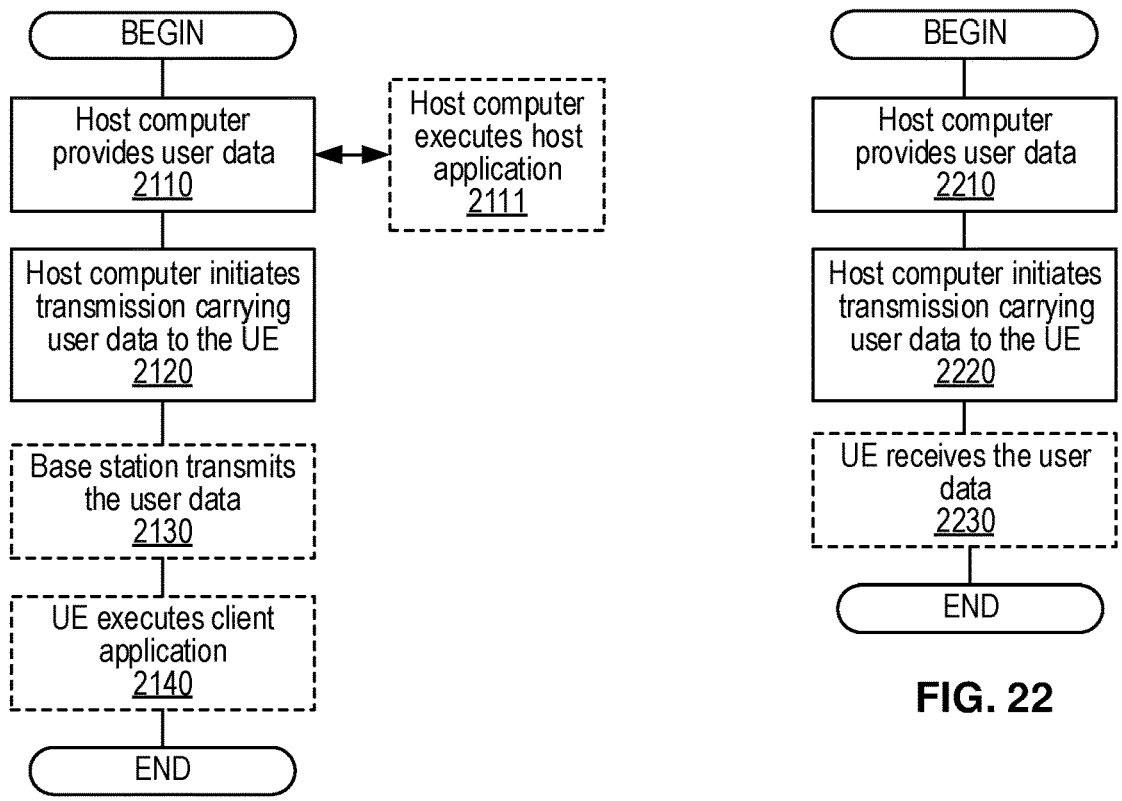
FIG. 21
FIG. 22
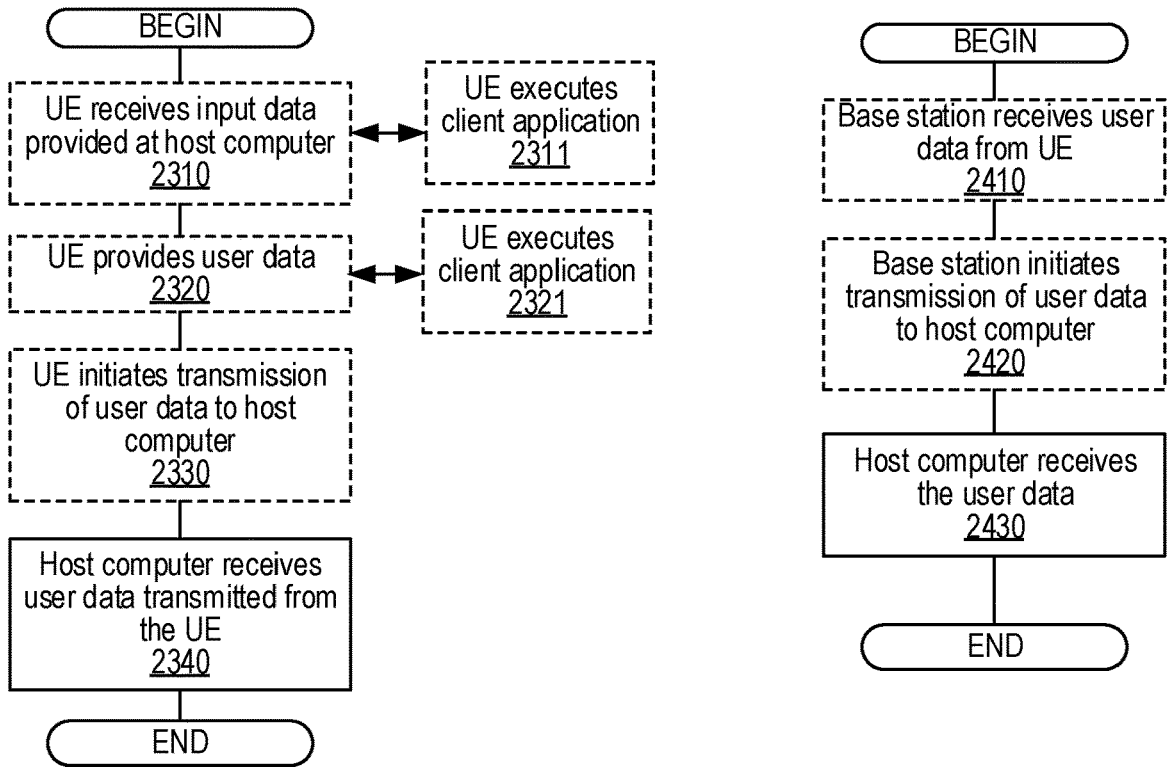
FIG. 23
FIG. 24

METHODS FOR CANCELLING OR UPDATE OF CONDITIONAL MOBILITY PROCEDURES

TECHNICAL FIELD

The present invention generally relates to wireless communication networks, and particularly relates to improvement in the robustness and/or functionality of user equipment (UE) mobility operations (e.g., handover) between cells in a wireless communication network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within 3GPP specifications, "user equipment" (or "UE") can refer to any wireless communication device (e.g., smartphone or computing device) that is capable of communicating with 3GPP-standard-compliant network equipment, including E-UTRAN and earlier-generation RANs (e.g., UTRAN/"3G" and/or GERAN/"2G") as well as later-generation RANs in some cases.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115, which communicate with each other via an X1 interface. The eNBs also are responsible for the E-UTRAN interface to EPC 130, specifically the S1 interface to the Mobility Management Entity (MME) and the Serving Gateway (SGW), shown collectively as MME/S-GWs 134 and 138 in FIG. 1.

In general, the MME/S-GW handles both the overall control of the UE and data flow between UEs (such as UE 120) and the rest of the EPC. More specifically, the MME processes the signaling (e.g., control plane, CP) protocols between UEs and EPC 130, which are known as the Non-Access Stratum (NAS) protocols. The S-GW handles all Internet Protocol (IP) data packets (e.g., user plane, UP) between UEs and EPC 130, and serves as the local mobility anchor for the data bearers when a UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 1 also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

Downlink (i.e., network node to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Uplink (i.e., UE to network node) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the network node in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description.

Furthermore, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier bandwidth, a PRB pair comprises 168 REs.

The LTE FDD uplink (UL) radio frame is configured in a similar manner as the exemplary FDD DL radio frame discussed above. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the PHY resources. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for network node DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

In LTE, RRC is used to configure/setup and maintain the radio connection between the UE and the network node. When the UE receives an RRC message from the network node, it will apply the configuration, and if this succeeds the UE generates an RRC complete message that indicates the transaction ID of the message that triggered this response.

Since LTE-release 8, three Signaling Radio Bearers (SRBs), namely SRB0, SRB1 and SRB2 have been available for the transport of RRC and Non Access Stratum (NAS) messages between the UE and network node. A new SRB, known as SRB1bis, was also introduced in rel-13 for supporting DoNAS (Data Over NAS) in NB-IoT. SRB0 is for RRC messages using the CCCH logical channel, and it is used for handling RRC connection setup, RRC connection resume and RRC connection re-establishment. Once the UE is connected to the network node (i.e., RRC connection setup or RRC connection reestablishment/resume has succeeded), SRB1 is used for handling RRC messages (which may include a piggybacked NAS message) as well as for NAS messages prior to the establishment of SRB2, all using DCCH logical channel. On the other hand, SRB2 is used for RRC messages, including logged measurement information as well as for NAS messages, all using DCCH logical channel. SRB2 has a lower priority than SRB1, because logged measurement information and NAS messages can be lengthy and could cause the blocking of more urgent and smaller SRB1 messages. SRB2 is always configured by E-UTRAN after security activation.

To support mobility between cells and/or beams, a UE can perform periodic cell search and measurements of signal power and/or quality (e.g., reference signal received power, RSRP, and/or reference signal received quality, RSRQ) in both RRC_CONNECTED and RRC_IDLE modes. For example, UE mobility in RRC_CONNECTED can be by handover, and UE mobility in RRC_IDLE can be by cell reselection. In both cases, the UE is responsible for detecting new neighbor cells, and for tracking and monitoring already detected cells. The detected cells and the associated measurement values are reported to the network. An LTE UE can perform such measurements on various downlink reference signals (RS) including, e.g., Cell-specific Reference Signals (CRS); MBSFN reference signals; UE-specific reference signal associated with PDSCH, ePDCCH or MPDCCH (DM-RS); Positioning Reference Signals (PRS); and CSI Reference signals (CSI-RS).

UE measurement reports to the network can be configured to be periodic or aperiodic (e.g., based a particular event). For example, the network can configure a UE to perform measurements on various carrier frequencies and various radio access technologies (RATs) corresponding to neighbor cells, as well as for various purposes including, e.g., mobility and positioning. The configuration for each of these measurements is referred to as a "measurement object." Furthermore, the UE can be configured to perform the measurements according to a "measurement gap pattern", which can include a measurement gap repetition period (MGRP) (i.e., how often a regular gap available for measurements occurs) and a measurement gap length (MGL) (i.e., the length of each recurring gap).

In LTE, the concept of Time-To-Trigger (TTT) is used to ensure that the event triggering criterion is satisfied for a long enough duration before a measurement report is sent by the UE. The triggering criterion and TTT are configured in a reportConfig message (or information element, IE) sent by the network to the UE. The value of TTT provided in reportConfig is applicable to all neighbor cells of the UE that could trigger a measurement report based on the specified triggering criterion.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

UE mobility operations are similar in NR and LTE. As mentioned above, an RRC_CONNECTED UE can be configured by the network to perform measurements and, upon triggering measurement reports, the network may send a handover (HO) command to the UE. In LTE, this command is an RRConnection-Reconfiguration message with a mobilityControlInfo field. In NR, this command is an RRCReconfiguration message with a reconfigurationWithSync field.

However, this handover process has various problems related to robustness. For example, the HO command (e.g., RRCConnectionReconfiguration with mobilityControlInfo or RRCReconfiguration with a reconfigurationWithSync) is normally sent when the radio conditions for the UE are already quite poor. As such, the HO command may need to be segmented (e.g., to allow for redundancy to protect against errors) and/or retransmitted (e.g., using HARQ) one or more times before it reaches the UE. In such case, the HO Command may not reach the UE in time before the degraded connection with the target node is dropped.

SUMMARY

Accordingly, exemplary embodiments of the present disclosure address these and other mobility-related issues in wireless communication networks by providing improvements to conditional mobility operations, such as conditional handovers between a source node (or cell) and a target node (or cell).

Exemplary embodiments of the present disclosure include methods (e.g., procedures) for mobility of a user equipment (UE) served by a second node in the RAN. These exemplary methods can be performed by a first node (e.g., base station, eNB, gNB, etc.) in the RAN (e.g., E-UTRAN, NG-RAN) that is associated with a target cell for the UE.

These exemplary methods can include receiving, from the second node, a request for a mobility procedure for the UE in relation to at least one candidate target cell associated with the first node. In various embodiments, the mobility procedure can be any of the following: handover, resume, re-establishment, reconfiguration with synchronization, beam switch, and secondary cell (SCell) addition. For example, the request can be a message such as, or similar to, a conditional handover request, described above.

These exemplary methods can also include determining if the UE can be accepted for the requested mobility procedure and, if the UE can be accepted, allocating resources to support mobility of the UE. Examples of allocated resources can include bearers, bandwidth, radio resources, power, UL/DL resources in general, C-RNTIs or any other UE identifier, RACH resources (e.g., preambles and/or UL time/frequency resources), etc.

These exemplary methods can also include transmitting, to the second node, a response that includes a configuration for the mobility procedure and that indicates the UE can be accepted unless a cancelling message is subsequently received from the second node. In some embodiments, the configuration can include one or more conditions for triggering UE execution of the mobility procedure. In some embodiments, the response can be an RRCReconfiguration message including a reconfigurationWithSync configuration, or an RRCConnection-Reconfiguration message including a mobilityControlInfo configuration.

In some embodiments, these exemplary methods can also include starting a resource reservation timer associated with the allocated resources. For example, the timer can be stopped upon the reception of a Handover Complete message (e.g., RRCConnection-ReconfigurationComplete or RRCReconfigurationComplete) transmitted by the UE when executing the handover to the target node. The timer can also be stopped upon an indication that the allocated resources are no longer needed, e.g., as indicated by reception of a cancelling message from the source node.

These exemplary methods can also include determining that the configuration is no longer valid. In some embodiments, the determining can be based on the expiration of the resource reservation timer started earlier. In other embodiments, the determining can include monitoring usage of the allocated resources and detecting, during the monitoring, any of the following conditions: a resource overload condition; a need to utilize the allocated resources for another mobility procedure (e.g., handover, conditional handover, conditional resume, conditional reestablishment, etc.); and/or other conditions relevant to resource usage.

These exemplary methods can also include transmitting, to the source node, an indication that the configuration is no longer valid. In some embodiments, this operation can include transmitting a cancelling indication and a cause why the configuration is no longer valid. The cancelling indication can be transmitted in response to determining that the configuration is no longer valid.

In other embodiments, this operation can include transmitting an updated configuration to the UE. In addition to indicating that the configuration is no longer valid, the updated configuration can override and/or replace the now-invalid configuration. The updated configuration can be transmitted in response to determining that the configuration is no longer valid. In some embodiments, the update can be transmitted from the first node to the second node as a Conditional Handover Update message. In various embodiments, the updated configuration can include any of the following:

updated list of PDU session resources for the UE that are admitted by the first node;
updated list of PDU session resources for the UE that are not admitted by the first node;
updated HandoverCommand message related to current operating conditions of the candidate target cell; and
one or more updated conditions for triggering UE execution of the mobility procedure.

Other exemplary embodiments of the present disclosure include additional methods (e.g., procedures) for mobility of a user equipment (UE) served by a second node in the RAN. These exemplary methods can be performed by the second node (e.g., base station, eNB, gNB, etc.) in the RAN (e.g., E-UTRAN, NG-RAN).

These exemplary methods can include transmitting, to a first node in the RAN, a request for a mobility procedure for the UE in relation to at least one candidate target cell associated with the first node. In various embodiments, the mobility procedure can be any of the following: handover, resume, re-establishment, reconfiguration with synchronization, beam switch, and secondary cell (SCell) addition. For example, the request can be a message such as, or similar to, a conditional handover request, described above.

These exemplary methods can also include receiving, from the first node, a response that includes a configuration for the mobility procedure and that indicates the UE can be accepted unless a cancelling message is subsequently received from the second node. In some embodiments, the configuration can include one or more conditions for triggering UE execution of the mobility procedure. For example, an exemplary condition can be that the quality of the target cell becomes X dB stronger than the UE's serving cell associated with the second node. In some embodiments, the response can be an RRCReconfiguration message including a reconfigurationWithSync configuration, or an RRCConnection-Reconfiguration message including a mobilityControlInfo configuration.

These exemplary methods can also include transmitting the configuration to the UE; receiving, from the first node, an indication that the configuration is no longer valid; and reconfiguring the UE based on the indication.

In some embodiments, the indication that the configuration is no longer valid can include a cancelling indication and a cause why the configuration is no longer valid. For example, the cancelling indication can be received as a Conditional Handover Cancel message. In such embodiments, reconfiguring the UE can include cancelling the mobility procedure. For example, cancelling the mobility procedure can include sending the UE a Conditional Handover Cancelled message.

In other embodiments, the indication that the configuration is no longer valid can include an updated configuration for the mobility procedure. For example, the updated configuration can be received as (or in) a Conditional Handover Update message. In such embodiments, reconfiguring the UE can include transmitting the updated configuration to the UE. For example, the update can be sent to the UE as a Conditional Handover Updated message. In some embodiments, the update can utilize delta signalling to modify, add, and/or remove specific fields and/or IEs of the previously provided configuration.

In various embodiments, the updated configuration can include any of the following:

updated list of PDU session resources for the UE that are admitted by the first node;
updated list of PDU session resources for the UE that are not admitted by the first node;
updated HandoverCommand message related to current operating conditions of the candidate target cell; and
one or more updated conditions for triggering UE execution of the mobility procedure.

Other exemplary embodiments of the present disclosure include methods (e.g., procedures) performed by a user equipment (UE, e.g., wireless device) served by a second node in a radio access network (RAN). These exemplary methods can include receiving, from the second node, a configuration for a mobility procedure in relation to at least one candidate target cell associated with a first node in the RAN. In various embodiments, the mobility procedure can be any of the following: handover, resume, re-establishment, reconfiguration with synchronization, beam switch, and SCell addition. In some embodiments, the configuration can include one or more conditions for triggering execution of the mobility procedure. For example, an exemplary condition can be that the quality of the candidate target cell (or beam) becomes X dB stronger than the UE's serving cell.

In some embodiments, these exemplary methods can also include performing radio resource management (RRM) measurements (e.g., of reference signals) to determine whether the one or more conditions for triggering execution of the mobility procedure have been met have been met. These exemplary methods can also include receiving from the second node, before the one or more conditions have been met, an indication that the configuration is no longer valid.

In some embodiments, the indication that the configuration is no longer valid can include a cancelling indication and a cause why the configuration is no longer valid. For example, the indication can be received as (or in) a Conditional Handover Cancelled message. In such embodiments, these exemplary methods can also include cancelling the mobility procedure associated with the configuration (e.g., in response to the Conditional Handover Cancelled message).

In other embodiments, the indication that the configuration is no longer valid can include an updated configuration for the mobility procedure. For example, the updated configuration can be received as (or in) a Conditional Handover Updated message. In some embodiments, the updated configuration can incorporate and/or utilize delta signalling to modify, add, and/or remove specific fields and/or IEs in relation to the previously provided configuration. In such embodiments, these exemplary methods can also include reconfiguring the mobility procedure associated with the configuration (e.g., in response to the Conditional Handover Updated message).

In various embodiments, the updated configuration can include any of the following:
  updated list of PDU session resources for the UE that are admitted by the first node;
  updated list of PDU session resources for the UE that are not admitted by the first node;
  updated HandoverCommand message related to current operating conditions of the candidate target cell; and
  one or more updated conditions for triggering UE execution of the mobility procedure.

In some of these embodiments, these exemplary methods can also include, based on determining that the one or more updated conditions have been met, performing the mobility procedure in relation to the candidate target cell, based on the updated configuration.

Exemplary embodiments also include network nodes (e.g., gNBs, eNBs, base stations, etc. or components thereof) and UEs (e.g., wireless devices, IoT devices, MTC devices, etc. or components thereof) configured to perform operations corresponding to any of the exemplary methods described herein. Exemplary embodiments also include non-transitory, computer-readable media storing computer-executable instructions that, when executed by processing circuitry of a network node or a UE, configure the network node or the UE to perform operations corresponding to any of the exemplary methods described herein.

These and other objects, features and advantages of exemplary embodiments of the present disclosure will become apparent upon reading the following Detailed Description in view of the Drawings briefly described below.

BRIEF DESCRIPTION OF THE DRAWINGS

FIG. 4, which is divided into

FIG. 6A shows an exemplary ASN.1 data structure that describes the content of a HandoverPreparationInformation message, while FIG. 6B provides various tables that describe the content of certain fields in the ASN.1 data structure shown in FIG. 6A.

FIG. 7 shows an exemplary ASN.1 data structure that describes the content of a HandoverCommand message.

FIG. 8, which includes

FIGS. 21-24 are flow diagrams of exemplary methods and/or procedures for transmission and/or reception of user data, according to various exemplary embodiments of the present disclosure.

DETAILED DESCRIPTION

Figure 1:
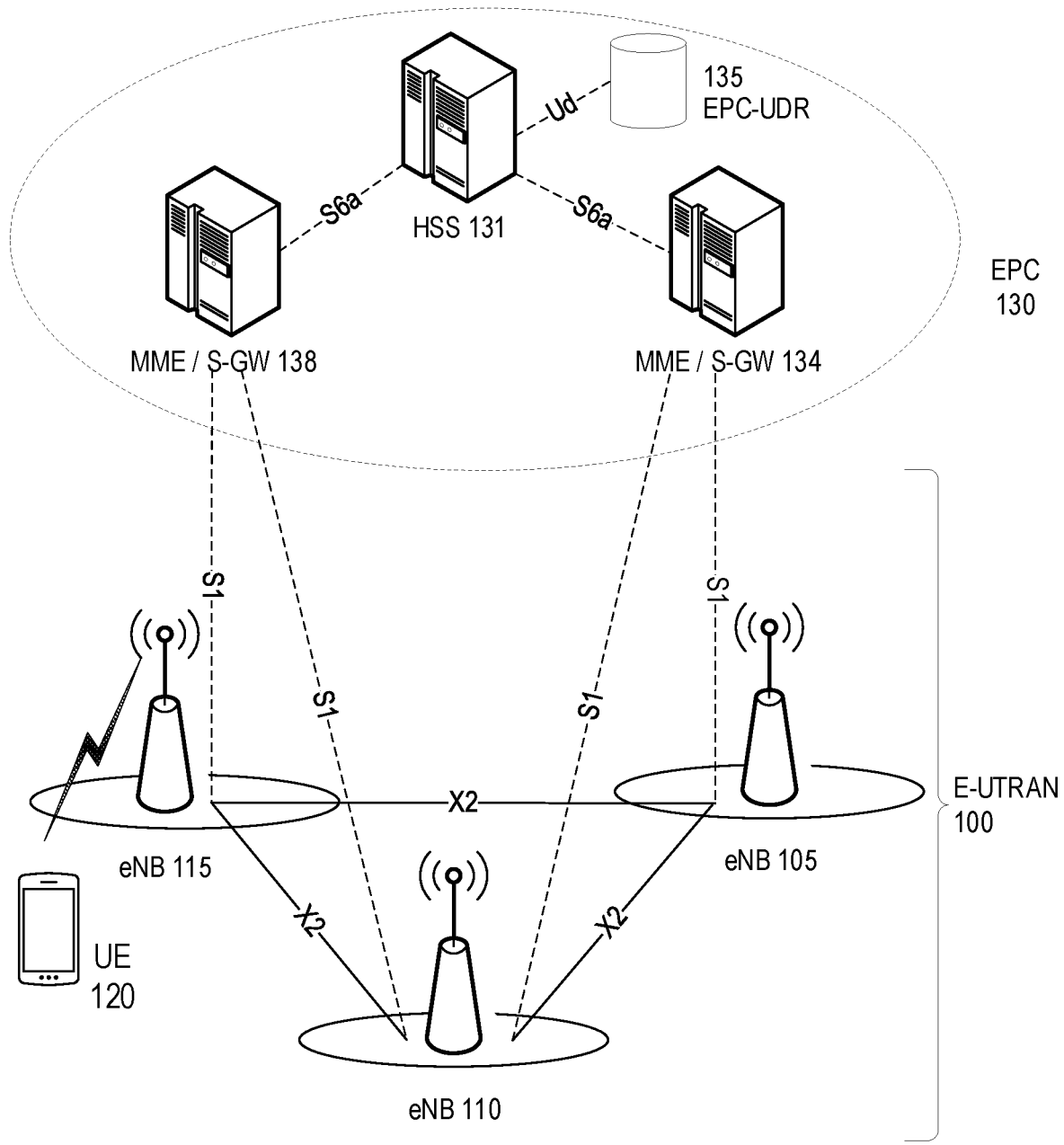
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
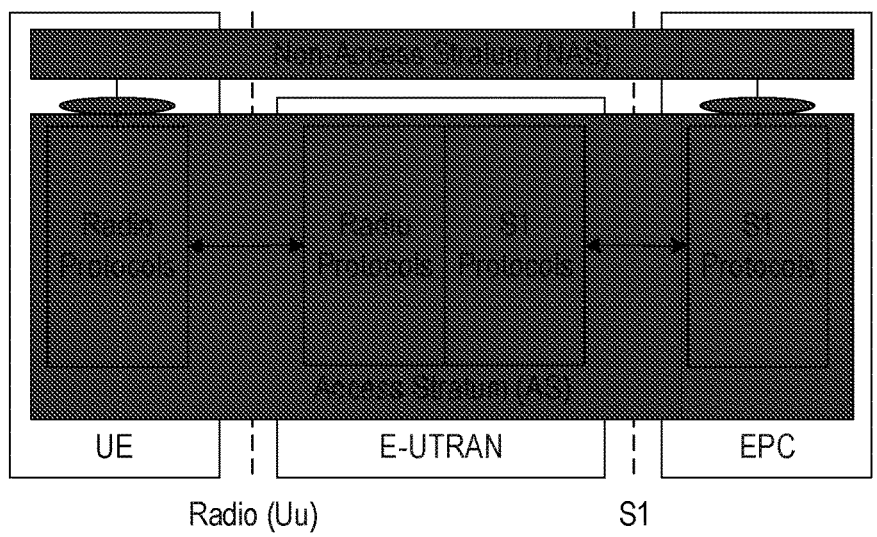
FIG. 2A is a high-level block diagram of an exemplary E-UTRAN architecture in terms of its constituent components, protocols, and interfaces.
Figure 2B:
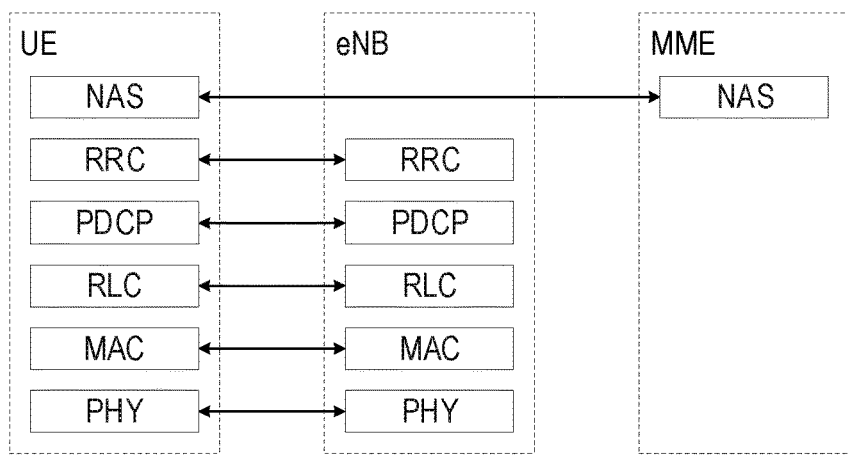
FIG. 2B is a block diagram of exemplary protocol layers of the control-plane portion of the radio (Uu) interface between a user equipment (UE) and the E-UTRAN.
Figure 2C:
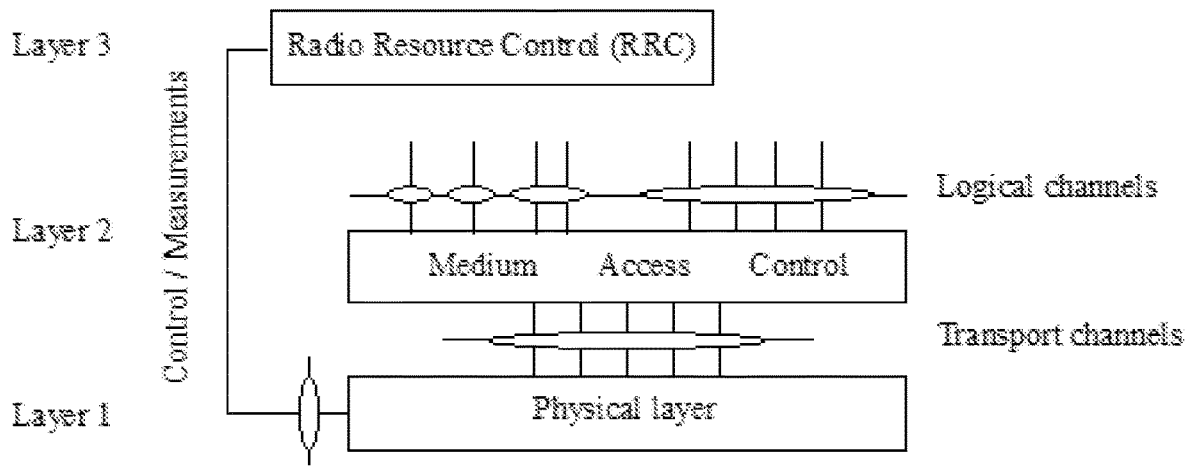
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

In the following, the terms eNB (eNodeB), gNB (gNodeB), MCG (Master Cell Group) and Primary Cell (PCell) may be used interchangeably to refer to the node or cell which the UE is connected to in single connectivity. Likewise, the terms SN (secondary node), SeNB (Secondary eNodeB), SgNB (Secondary gNodeB), SCG (Secondary Cell Group), and PSCell (Primary Secondary Cell) may be used interchangeably to refer to the secondary node or cell that the UE is connected to when the UE is configured with dual connectivity (DC).

As discussed above, the current handover process in LTE and NR has various problems related to robustness. These problems and specific improvements provided by exemplary embodiments of the present disclosure are discussed below in more detail.

Figure 3:
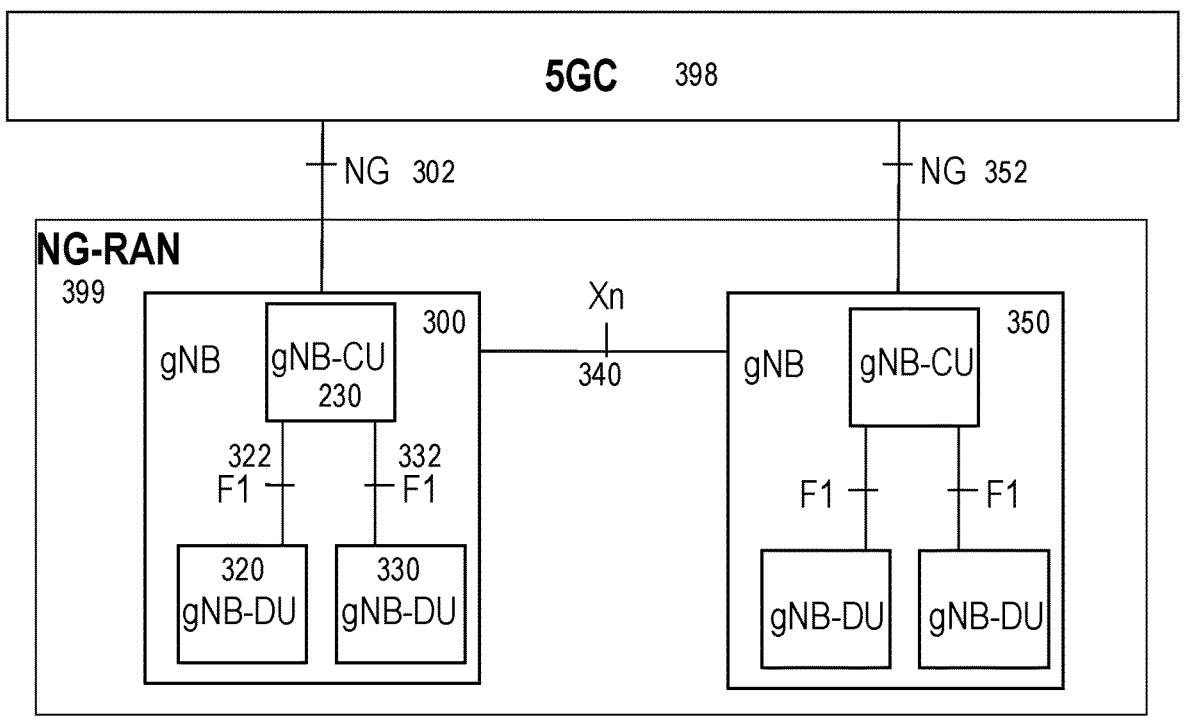
FIG. 3 illustrates a high-level view of the 5G network architecture, including split central unit (CU)-distributed unit (DU) split architecture of gNBs.

FIG. 3 illustrates a high-level view of the 5G network architecture, consisting of a Next Generation RAN (NG-RAN) 399 and a 5G Core (5GC) 398. NG-RAN 399 can include one or more gNodeB's (gNBs) connected to the 5GC via one or more NG interfaces, such as gNBs 300, 350 connected via interfaces 302, 352, respectively. More specifically, gNBs 300, 350 can be connected to one or more Access and Mobility Management Functions (AMF) in the 5GC 398 via respective NG-C interfaces. Similarly, gNBs 300, 350 can be connected to one or more User Plane Functions (UPFs) in 5GC 398 via respective NG-U interfaces.

Although not shown, in some deployments 5GC 398 can be replaced by an Evolved Packet Core (EPC), which conventionally has been used together with LTE E-UTRAN. In such deployments, gNBs 300, 350 can connect to one or more Mobility Management Entities (MMEs) in EPC via respective S1-C interfaces. Similarly, gNBs 300, 350 can connect to one or more Serving Gateways (SGWs) in EPC via respective NG-U interfaces.

In addition, the gNBs can be connected to each other via one or more Xn interfaces, such as Xn interface 340 between gNBs 300 and 350. The radio technology for the NG-RAN is often referred to as "New Radio" (NR). For the NR interface to UEs, each of the gNBs can support frequency division duplexing (FDD), time division duplexing (TDD), or a combination thereof.

Furthermore, NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401 v15.5.0) shall be applied.

The NG-RAN logical nodes shown in FIG. 3 (and described in 3GPP TS 38.401 v15.3.0 and 3GPP TR 38.801 v14.0.0) include a Central Unit (CU or gNB-CU) and one or more Distributed Units (DU or gNB-DU). For example, gNB 300 includes gNB-CU 310 and gNB-DUs 320 and 330. CUs (e.g., gNB-CU 310) are logical nodes that host higher-layer protocols and perform various gNB functions such controlling the operation of DUs. A DU (e.g., gNB-DUs 320, 330) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 322 and 332 shown in FIG. 3. However, a gNB-DU can be connected to only a single gNB-CU. The gNB-CU and connected gNB-DU(s) are only visible to other gNBs and the 5GC as a gNB. In other words, the F1 interface is not visible beyond gNB-CU. Furthermore, the F1 interface between the gNB-CU and gNB-DU is specified and/or based on the following general principles:

F1 is an open interface;
F1 supports the exchange of signalling information between respective endpoints, as well as data transmission to the respective endpoints;
from a logical standpoint, F1 is a point-to-point interface between the endpoints (even in the absence of a physical direct connection between the endpoints);
F1 supports control plane (CP) and user plane (UP) separation, such that a gNB-CU may be separated in CP and UP;
F1 separates Radio Network Layer (RNL) and Transport Network Layer (TNL);
F1 enables exchange of user-equipment (UE) associated information and non-UE associated information;
F1 is defined to be future proof with respect to new requirements, services, and functions;
A gNB terminates X2, Xn, NG and S1-U interfaces and, for the F1 interface between DU and CU, utilizes the F1 application part protocol (F1-AP) which is defined in 3GPP TS 38.473 (v15.3.0).

Furthermore, a CU can host protocols such as RRC and PDCP, while a DU can host protocols such as RLC, MAC and PHY. Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized UP protocols (e.g., PDCP-U).

It has also been agreed in 3GPP to support a separation of gNB-CU into a CU-CP function (including RRC and PDCP for signaling radio bearers) and CU-UP function (including PDCP for UP). The CU-CP and CU-UP functions can communicate with each other using the E1-AP protocol over the E1 interface. In addition to the new E1 interface, the F1 interface can be logically separated into CP (F1-C) and UP (F1-U) functionalities. The following scenarios for the split CU-UP/CP are defined in 3GPP TR 38.804:

CU-CP and CU-UP centralized;
CU-CP distributed and CU-UP centralized; and
CU-CP centralized and CU-UP distributed.

Similar to LTE, the NR PHY uses CP-OFDM (Cyclic Prefix Orthogonal Frequency
Division Multiplexing) in the DL and both CP-OFDM and DFT-spread OFDM (DFT-S-OFDM) in the UL. In the time domain, NR DL and UL physical resources are organized into equal-sized, 1-ms subframes. Each subframe includes of one or more slots, and each slot includes 14 (for normal cyclic prefix) or 12 (for extended cyclic prefix) time-domain symbols.

As mentioned above, an RRC_CONNECTED UE can be configured by the network to perform measurements and, upon triggering measurement reports, the network may send a handover (HO) command to the UE. In LTE, this command is an RRConnection-Reconfiguration message with a mobilityControlInfo field. In NR, this command is an RRCReconfiguration message with a reconfigurationWithSync field.

These reconfigurations are prepared by the handover target node upon a request from the source node, exchanged over X2 or S1 interface in LTE (see, e.g., FIG. 1) or NG interface in case of NR (see, e.g., FIG. 3). These reconfigurations typically take into account the existing RRC configuration the UE has with source cell, which are provided in the inter-node request. These reconfiguration parameters provided by target contains all information the UE needs to access the target cell, e.g., random access configuration, a new C-RNTI assigned by the target cell, security parameters enabling the UE to calculate new security keys associated with the target cell, etc. The new security keys enable the UE to send a handover complete message on SRB1, which is encrypted and integrity protected, upon accessing the target cell.

However, this handover process has various problems related to robustness. For example, the HO command (e.g., RRCConnectionReconfiguration with mobilityControlInfo or RRCReconfiguration with a reconfigurationWithSync) is normally sent when the radio conditions for the UE are already quite bad. As such, the HO command may need to be segmented (e.g., to allow for redundancy to protect against errors) and/or retransmitted (e.g., using HARQ) one or more times before it reaches the UE. In such case, the HO Command may not reach the UE in time before the degraded connection with the target node is dropped.

Figure 4A:
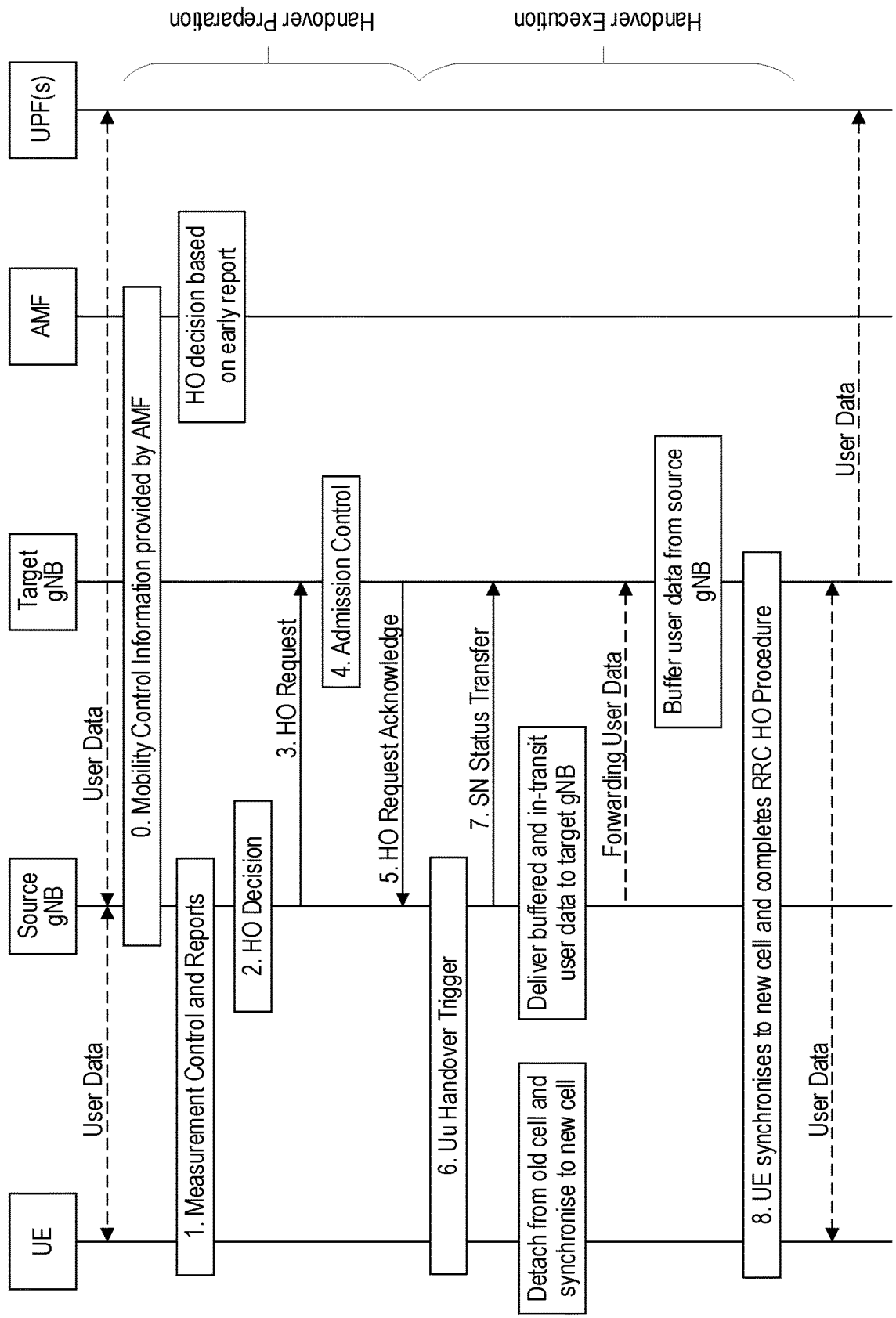
FIGS. 4A and 4B, illustrates an exemplary signalling flow between a UE, a source node (e.g., source gNB), and a target node (e.g., target gNB) during a handover procedure in an NR network.
Figure 4B:
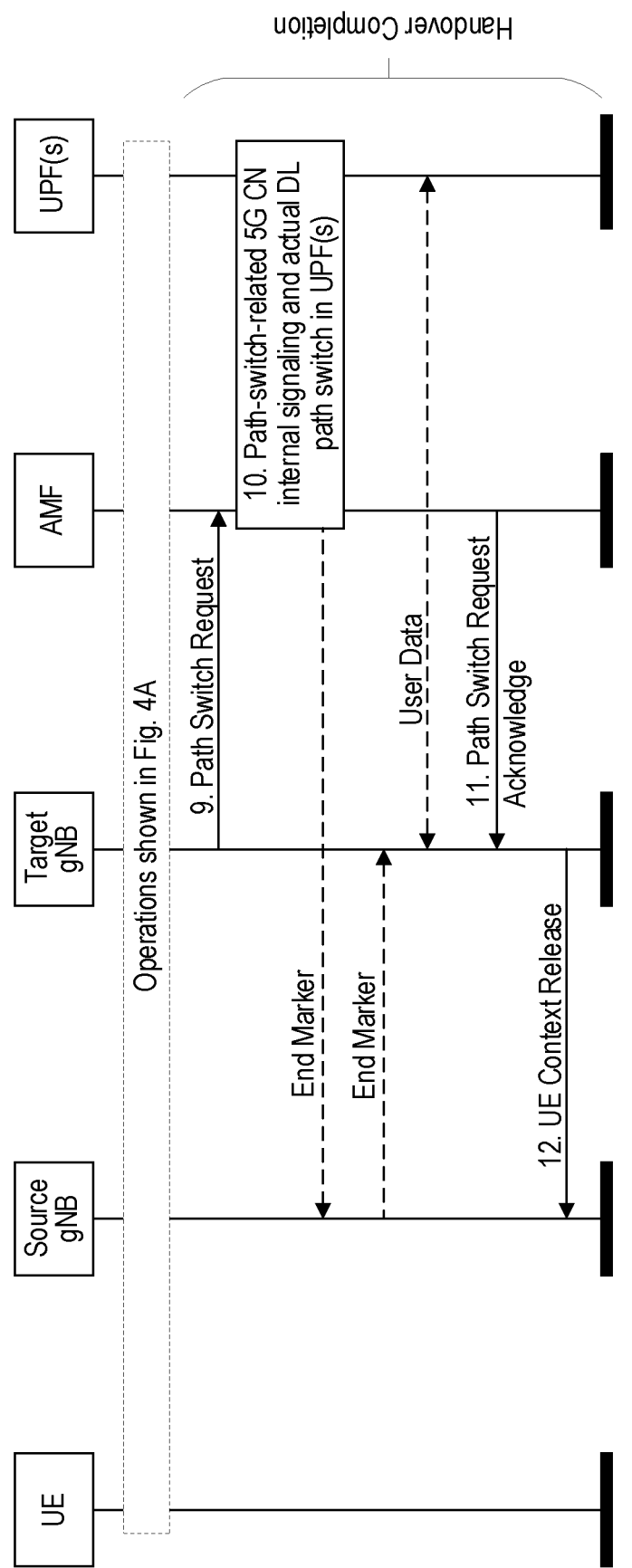

FIG. 4, which is divided in to FIGS. 4A and 4B, illustrates the signalling flow between a UE, a source node (e.g., source gNB), and a target node (e.g., target gNB) during a handover procedure in an NR network. FIG. 4 also illustrates the roles of 5GC functions including access management function (AMF) and user-plane function (UPF). Even so, the following discussion addresses various principles related to HO (or more generally, UE mobility while in RRC_CONNECTED mode) in both NR and LTE networks.

First, UE mobility in RRC_CONNECTED is network-based, since the network has the most recent and/or most accurate information regarding current situation such as load conditions, resources in different nodes, available frequencies, etc. The network can also take into account the situation of many UEs in the network, from a resource allocation perspective.

As illustrated in FIG. 4, there are three phases to the handover procedure: handover preparation, handover execution, and handover completion. During the handover preparation phase, the network prepares a target cell before the UE accesses that cell. The source node receives measurement reports from the UE (operation 1), makes a handover decision based on these reports (e.g., operation 2), and negotiates a handover of the UE with the target node (e.g., operations 3-5).

During handover execution, the source node provides the UE with various information to trigger handover to a target cell served by the target node (operation 6), and also provides the target node with the UE's current status in the source node (operation 7). For example, the source node (e.g., in operation 6) provides the UE with the RRC configuration to be used in the target cell, including SRB1 configuration (e.g., parameters from which to derive keys for encryption/integrity protection) to send the HO complete message (e.g., RRCConnection-ReconfigurationComplete). The source node provides the UE with a target C-RNTI, so that the target node can identify the UE from random-access msg3 on MAC level for the HO complete message. This information is received from the target node during the handover preparation phase. Accordingly, unless a failure occurs, there is no need for the target node to perform UE context fetching.

Furthermore, to speed up the HO, the source node provides the UE with needed information on how to access the target (e.g. RACH configuration), so the UE does not have to acquire target node system information (SI, e.g., from broadcast) prior to the handover. Both full and delta reconfiguration are supported so that the HO command can be minimized. The UE may be provided with contention-free random-access (CFRA) resources; in that case, the target node can identify the UE from the RACH preamble (also referred to as msg1). More generally, the normal HO procedure can always be optimized with dedicated resources, such as CFRA resources.

Also during the handover execution phase, the UE detaches from the old cell (e.g., served by the source node) and synchronises to the new cell served by the target node (e.g., operation 8). Concurrent with these operations, the source node delivers buffered user data for the UE to the target node, which can subsequently communicate this user data to the UE after the UE completes the handover.

During the handover completion phase, the target node and the source node in the NG-RAN communicate with the 5GC (e.g., the AMF) to update the path information associated with the UE (e.g., operations 9 and 11). In addition, nodes or functions within the 5GC (e.g., AMF and UPF) can communicate to update the UE path based on the handover (e.g., operation 10). Finally, the target node can inform the source node that it can release the UE's context (e.g., operation 12).

In LTE and NR, different solutions to increase mobility robustness have been discussed. One solution discussed for NR Rel-16 is called "conditional handover" or "early handover command." To avoid the undesired dependence of the serving radio link upon the degraded radio conditions at the time when the UE should execute the handover, this solution give the possibility to provide RRC signaling for the handover to the UE earlier, before such degraded radio conditions occur. To achieve this, the HO command can be associated with a condition (e.g., radio conditions similar to the ones associated to an A3 event) where a given neighbour becomes X dB better than target. As soon as the condition is fulfilled, the UE executes the handover in accordance with the earlier-provided handover command.

For example, an exemplary execution condition could be that the quality of the target cell or beam becomes X dB stronger than the serving cell. A preceding measurement reporting event could use a threshold Y that is selected to lower than the one in the handover execution condition. This allows the serving cell to prepare the handover upon reception of an early measurement report and to provide the RRCConnectionReconfiguration with mobilityControlInfo (LTE) or RRCReconfiguration with a reconfigurationWith-Sync (NR) at a time when the radio link between the source cell and the UE is still relatively stable. The execution of the handover is done at a later point in time (and threshold) that is optimal and/or preferred for handover execution.

Figure 5:
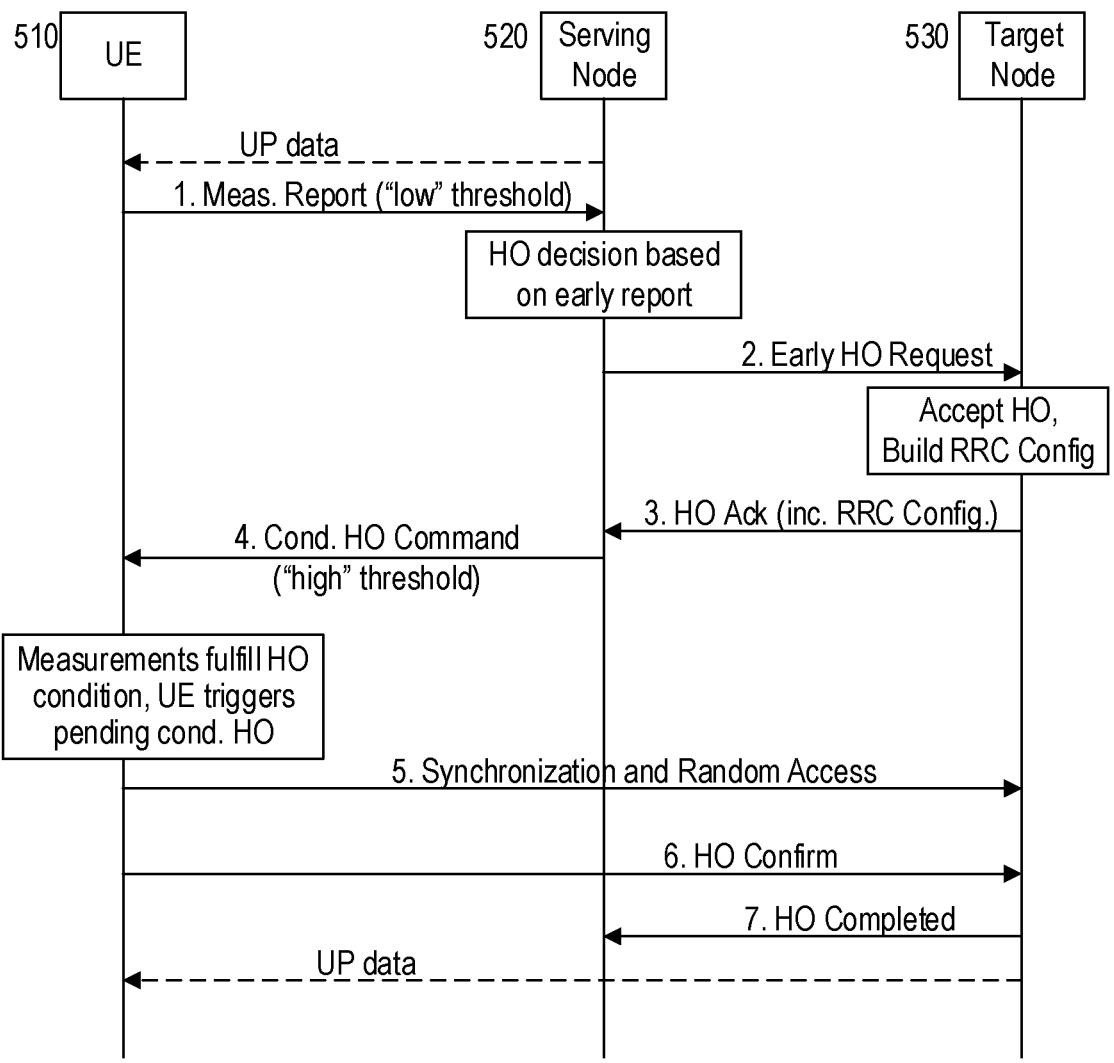
FIG. 5 shows a signalling flow of an exemplary conditional HO, such as described above, involving a single serving cell and a single target cell.

FIG. 5 illustrates an exemplary signal flow between a user equipment (UE), a source node, and a target node for a conditional handover (HO), according to exemplary embodiments of the present disclosure. The serving and target network nodes can be, e.g., gNBs and/or components of gNBs, such as CUs and/or DUs.

This procedure involves two different measurement thresholds: a low threshold and a high threshold. The two thresholds can be expressed as different levels of a particular metric, e.g., signal strength, signal quality, etc. For example, the high threshold could be that the quality of the mobility RS (MRS) of the target cell or beam becomes X dB stronger than the MRS of the UE's serving cell (e.g., provided by the source node), with the low threshold being less than the high threshold (i.e., target exceeds source by lower amount). As used in this context, MRS denotes a reference signal used for any mobility-related purpose. For example, in NR, MRS can be either SSB (SS/PBCH block) or CSI-RS. As a further example, for NR operating in unlicensed spectrum (referred to as NR-U), MRS can be a discovery reference signal (DRS) in addition to any of the signals mentioned above.

The UE can be provided with a measurement configuration including the low threshold (not shown in the figure). Upon performing measurements that meet the low threshold, the UE can send a measurement report to the serving node (operation 1). While performing the measurements and evaluating the low threshold, the UE continues operating in its current RRC configuration. In operation 2, based on this report, the source node can decide to request an early handover of the UE to the target node (e.g., to a cell indicated in the measurement report). For example, this early handover request can include a HandoverPreparation-Information IE such as described above.

The target node performs admission control for the UE and responds with the handover acknowledgement (operation 3) that includes RRC configuration, similar to the basic handover shown in FIG. 4. In operation 4, the source node then sends the UE a "Conditional HO Command", which can include the high threshold. Upon receiving this command, the UE continues to perform measurements and whenever the high threshold condition is met, it can move to the target node and perform the handover (e.g., operations 5-7). Even so, the UE can remain in the serving cell (i.e., provide by the source node) for an extended amount of time in case the high threshold condition is not fulfilled.

This procedure allows the serving cell to prepare the handover upon reception of an early measurement report and to provide the Conditional HO Command (e.g., RRCConnectionReconfiguration with mobilityControlInfo for LTE, or RRCReconfiguration with either a reconfigurationWith-Sync or a CellGroupConfig for NR) at a time when the radio link between the source cell and the UE is still relatively stable. The UE executes the handover at a later point in time (and threshold) that is optimal and/or preferred.

Although FIG. 5 shows an exemplary conditional handover involving a single serving cell and a single target cell, other scenarios may involve many cells or beams that the UE has reported as possible candidates based on its radio resource management (RRM) measurements. The network should have the freedom to issue conditional handover commands for one or more of those candidates. The RRC-ConnectionReconfiguration for each of those candidates may differ, in terms of the HO execution condition (e.g., reference signal (RS) to measure, threshold to exceed, etc.) and/or in terms of the RA preamble to be sent when a condition is met.

An alternative solution relies on UE context fetching, where a condition is also provided to the UE and, upon the fulfillment of the condition, the UE executes an RRC Resume procedure towards at least one target cell. In general, both conditional handover and this conditional resume procedure are examples of conditional mobility procedures, discussed herein.

To summarize, in both NR and LTE, two inter-node messages are typically used in relation to HO. The HandoverPreparationInformation message is used to transfer the NR RRC information used by the target gNB during handover preparation, including UE capability information. When the source node decides to handover the UE, the source node provides the target node with information in the HandoverPreparationInformation message that enables the target node to prepare an RRCReconfiguration message (provided later in the HandoverCommand) that the UE can use in the target node upon handover execution.

FIG. 6A shows an exemplary ASN.1 data structure that describes the content of a HandoverPreparationInformation message, while FIG. 6B provides various tables that describe the content of fields in the ASN.1 data structure of FIG. 6A. The HandoverCommand message is used to transfer the handover command as generated, by the target gNB, to the source gNB. FIG. 7 shows an exemplary ASN.1 data structure that describes the content of a HandoverCommand message.

3GPP TS 38.420 (v15.1.0) defines a function called "Handover preparation function" that allows the exchange of information between source and target NG-RAN nodes in order to initiate the handover of a certain UE to the target. An equivalent function, called "S-NG-RAN-node Addition Preparation," exists for dual-connectivity (DC) setup. In addition, 3GPP TS 38.420 defines a "Handover cancellation function" that allows informing an already prepared target NG-RAN node that a prepared handover will not take place. It allows releasing the resources allocated during a preparation.

Figure 8A:
FIGS. 8A-8C, shows signalling flows of various exemplary handover-related operations in an NR network.

FIG. 8A shows a successful operation of the Handover preparation function. The source NG-RAN node initiates the procedure by sending the HANDOVER REQUEST message to the target NG-RAN node. When the source NG-RAN node sends the HANDOVER REQUEST message, it shall start the timer $TXn_{RELOCprep}$. At reception of the HANDOVER REQUEST message the target NG-RAN node prepares the configuration of the AS security relation between the UE and the target NG-RAN node by using the information in the UE Security Capabilities IE and the AS Security Information IE in the UE Context Information IE, as specified in 3GPP TS 33.501 (v15.2.0).

Figure 8B:
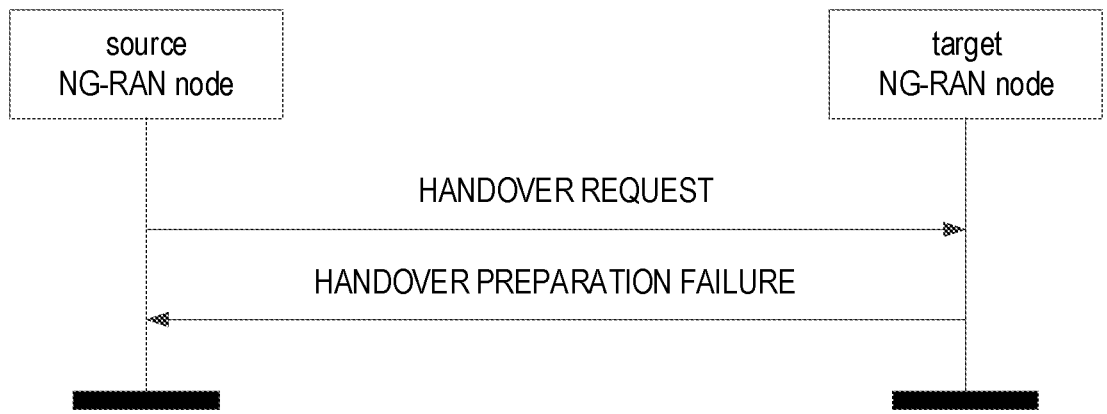

FIG. 8B shows an unsuccessful operation of the Handover preparation function. If the target NG-RAN node does not admit at least one PDU session resource, or a failure occurs during the Handover Preparation, the target NG-RAN node sends the HANDOVER PREPARATION FAILURE message to the source NG-RAN node. The message shall contain the Cause information element (IE) with an appropriate value. If there is no response from the target NG-RAN node to the HANDOVER REQUEST message before timer $TXn_{RELOCprep}$ expires in the source NG-RAN node, the source NG-RAN node should cancel the Handover Preparation procedure towards the target NG-RAN node by initiating the Handover Cancel procedure with the appropriate value for the Cause IE. The source NG-RAN node ignores any HANDOVER REQUEST ACKNOWLEDGE or HANDOVER PREPARATION FAILURE message received after the initiation of the Handover Cancel procedure and releases any resources related to the concerned Xn UE-associated signalling.

Furthermore, if the supported algorithms for encryption defined in the UE Security Capabilities IE in the UE Context Information IE, plus the mandated support of the EEA0 and NEA0 algorithms in all UEs (see, e.g., 3GPP TS 33.501 v15.2.0), do not match any allowed algorithms defined in the configured list of allowed encryption algorithms in the NG-RAN node, the NG-RAN node rejects the procedure using the HANDOVER PREPARATION FAILURE message. Similarly, if the supported algorithms for integrity defined in the UE Security Capabilities IE in the UE Context Information IE, plus the mandated support of the MO and NIA0 algorithms in all UEs (see, e.g., 3GPP TS 33.501 v15.2.0), do not match any allowed algorithms defined in the configured list of allowed integrity protection algorithms in the NG-RAN node, the NG-RAN node rejects the procedure using the HANDOVER PREPARATION FAILURE message.

Figure 8C:

FIG. 8C shows a successful operation of the Handover Cancel procedure. As briefly mentioned above, this procedure enables a source NG-RAN node to cancel an ongoing handover preparation or an already prepared handover. If the HANDOVER CANCEL message refers to a context that does not exist, the target NG-RAN node shall ignore the message.

In a conventional mobility procedure (e.g., handover), the inter-node messages between source and target nodes may either be inter-node RRC and/or X2/Xn messages, as described above. In existing conditional handover solutions, the source node requests a target node to prepare a conditional handover message for a candidate target cell. Then, when the target node prepares that message, it also needs to reserve/prepare/allocate resources such as target C-RNTI, RACH (e.g., contention free RACH resources), transmission power, bandwidth, etc. In addition, the target node needs to make sure the services/bearers the UE is running are supported in the target with a minimum QoS, etc.

One problem with this solution is that the target does not really know when the UE will fulfill the condition that will trigger the handover or, for DC scenarios, a secondary cell group (SCG) change or an SCG addition. In addition, since conditional handover may support configuration of multiple target cell candidates possibly from multiple target candidate nodes, a particular target candidate node it is not certain that the UE will execute the handover to that node. Furthermore, since the operating conditions (e.g., load) in a mobile network are quite volatile, such operating conditions may be very different between the time a particular target candidate for conditional handover accepts a request from a source node, and the time the UE performs the handover execution.

One solution has been proposed in 3GPP RAN2 WG contribution R2-1816691. This proposal introduces a timer to indicate, to the UE, how long the dedicated RACH resource allocated by target candidate node for conditional handover can be valid. This proposal only focuses on RACH validity. In addition, this proposal assumes that the target candidate node is able to predict the UL RACH load in the target cell such that the additional RACH resources allocated for conditional handover do not overlad the RACH capacity. In general, the target node may not be able to quickly respond to significant changes in load conditions.

Furthermore, in the case of multiple candidate targets, each target would have to provide its own timer value, which may differ. As such, to determine when the UE needs to be reconfigured with new conditional HO configurations, a source node would have to receive and interpret the message, with the timer value, from target candidates to the UE. That requirements is both complicated and inefficient in terms of signalling overhead.

Exemplary embodiments of the present disclosure address these and other problems, challenges, and/or issues by providing specific enhancements and/or improvements to mobility robustness in wireless communication networks. In general, exemplary embodiments include techniques and/or mechanisms that enable a target node, that has committed to accept a UE in a conditional handover, to cancel that commitment and subsequently be able to use the resources (e.g., C-RNTI, RACH resources, etc.) previously allocated for that UE for other purposes and/or users. Exemplary embodiments also include techniques and/or mechanisms that enable a source node to update a UE to indicate that the previously-provided conditional handover command, associated with a target node, is no longer valid. In response, the UE can stop handover-related actions toward the target node, such as measurement, monitoring of the execution trigger condition, etc.

Compared to existing techniques and/or mechanisms, including those described herein, exemplary embodiments of the present disclosure improve mobility robustness by facilitating conditional mobility operations (e.g., conditional handover), while giving target nodes some control over the conditional mobility process via the ability to cancel and/or update a previous conditional mobility commitment in view of a change in the conditions under which the commitment was made. As such, exemplary embodiments improve the overall functionality and robustness of conditional mobility in wireless communication networks.

In the present disclosure, the term "conditional mobility" is used to refer to various operations such as conditional handover, conditional resume, conditional reconfiguration with sync, and conditional reconfiguration. More generally, "conditional mobility" is meant to include any UE mobility-related procedure (e.g. resume, handover, reconfiguration with sync, beam switching, etc.) that is configured by network and that contains a condition (e.g. associated to measurement event) that, if triggered, results in the UE performing the mobility-related procedure.

Exemplary embodiments disclosed herein are applicable to conditional mobility configurations associated with a single cell or with multiple cells. For example, the cancelling mechanism triggered by the target node towards the source node may cancel any of the following alternatives:

- a single conditional handover for a single UE that has a target cell in the target node as a candidate for conditional handover;
- multiple conditional handovers for a single UE that has at least one target cell in the target node as a candidate for conditional handover;
- multiple conditional handovers for multiple UEs that have at least one target cell in the target node as a candidate for conditional handover; or
- all conditional handovers for multiple UEs that have at least one target cell in the target node as a candidate for conditional handover.

In general, exemplary embodiments are often described herein as being performed in NR or LTE networks. For example, the configuration of a UE conditional HO is received in an NR network and executed in an NR network. However, exemplary embodiments are also applicable to inter-RAT conditional mobility, such as:

- UE is configured with a conditional HO in NR, then the condition is triggered and UE executes the HO in LTE;
- UE is configured with a conditional HO in LTE, then the condition is triggered and UE executes the HO in NR; or
- In more general terms, UE is configured with a condition HO in RAT-1, then the condition is triggered and UE executes the HO in RAT-2.

Many of the UE (and network) operations are described herein in terms of handover or reconfigurations with synchronization (sync), which may include a cell change. However, exemplary embodiments are also applicable to situations where a cell is added, e.g., multi-connectivity scenarios such as carrier aggregation (CA), dual connectivity (DC), multi-RAT dual connectivity, etc. In such cases, a conditional mobility configuration may be for SCG addition, SCell addition, etc.

Exemplary embodiments are also applicable to intra-cell conditional mobility procedures, e.g. a reconfiguration with sync with cell identity the same as a serving cell. Furthermore, inter-node procedures and/or messages supporting conditional mobility may include any of the following:

- Inter-node intra-RAT intra-system, such as NR gNBs over Xn;
- Inter-node intra-RAT intra-system, such as ng-eNBs over Xn;
- Inter-node intra-RAT intra-system, such as LTE eNBs over X2;
- Inter-node inter-RAT intra-system, such as ng-eNBs and gNBs over Xn; or
- Inter-node inter-RAT inter-system, such as E-UTRAN and NG-RAN, i.e. gNBs/en-gNBs and eNBs over NG and S1.

Figure 9:
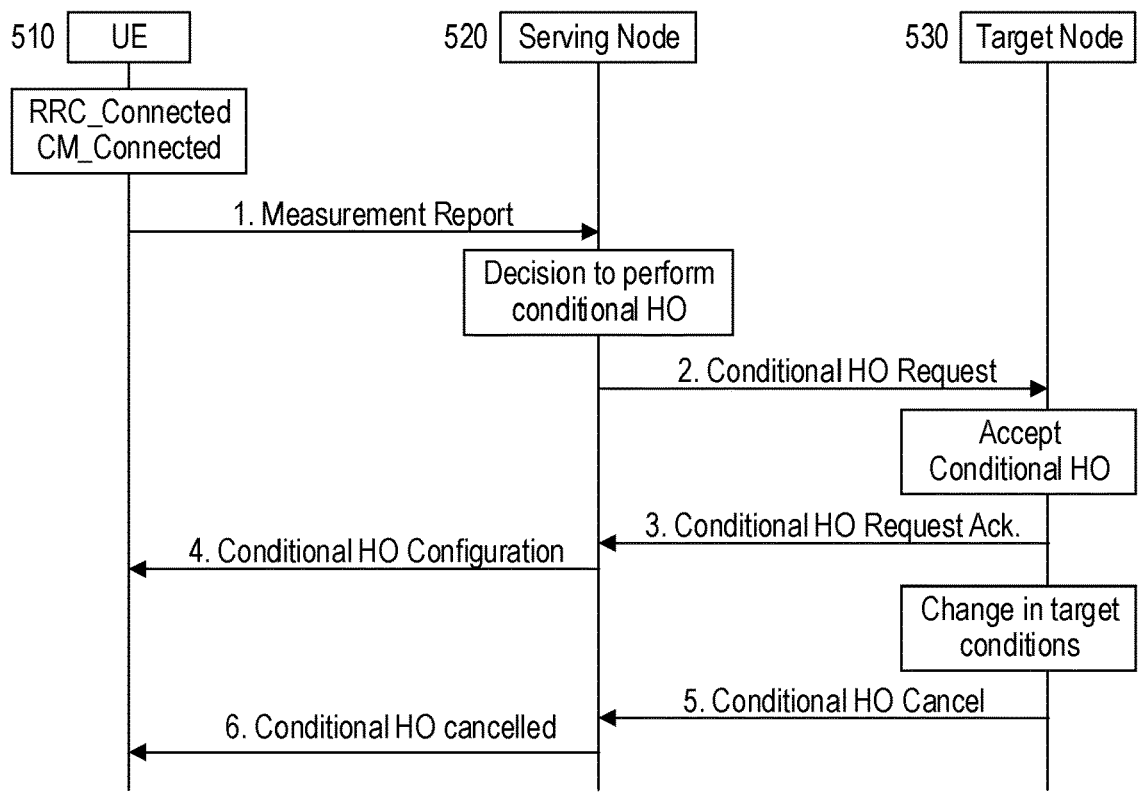
FIG. 9 shows an exemplary signalling flow associated with the cancellation of a conditional mobility procedure (e.g., a conditional HO), according to various exemplary embodiments of the present disclosure.
Figure 10:
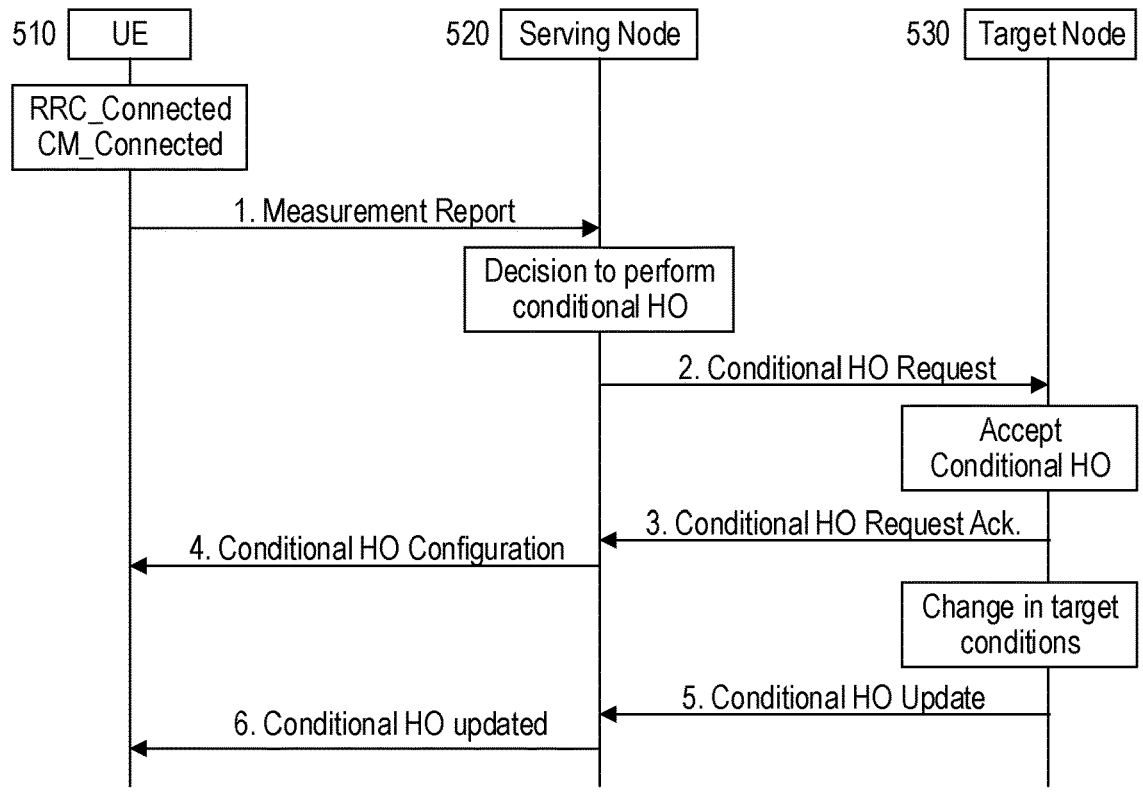
FIG. 10 shows an exemplary signalling flow associated with the update of a conditional mobility procedure (e.g., a conditional HO), according to various exemplary embodiments of the present disclosure.

FIG. 9 shows an exemplary signalling flow associated with the cancellation of a conditional mobility procedure (e.g., a conditional HO), in accordance with certain exemplary embodiments. Portions of this procedure can be specified by the exemplary text given in Appendix A. FIG. 10 shows an exemplary signalling flow associated with the update of a conditional mobility procedure (e.g., a conditional HO), in accordance with other exemplary embodiments. Portions of this procedure can be specified by the exemplary text given in Appendix B. The text in Appendices A and/or B can be included in a 3GPP specification (e.g., 3GPP TS 38.423 v15.1.0). Various exemplary embodiments associated with individual nodes shown in FIGS. 9-10 are described in more detail below.

These embodiments described above can be further illustrated with reference to FIGS. 13-15, which depict exemplary methods and/or procedures performed by a first node in a RAN, a second node in the RAN, and a UE, respectively. In other words, various features of the operations described below, with reference to FIGS. 13-15, correspond to various embodiments described above.

Figure 13:
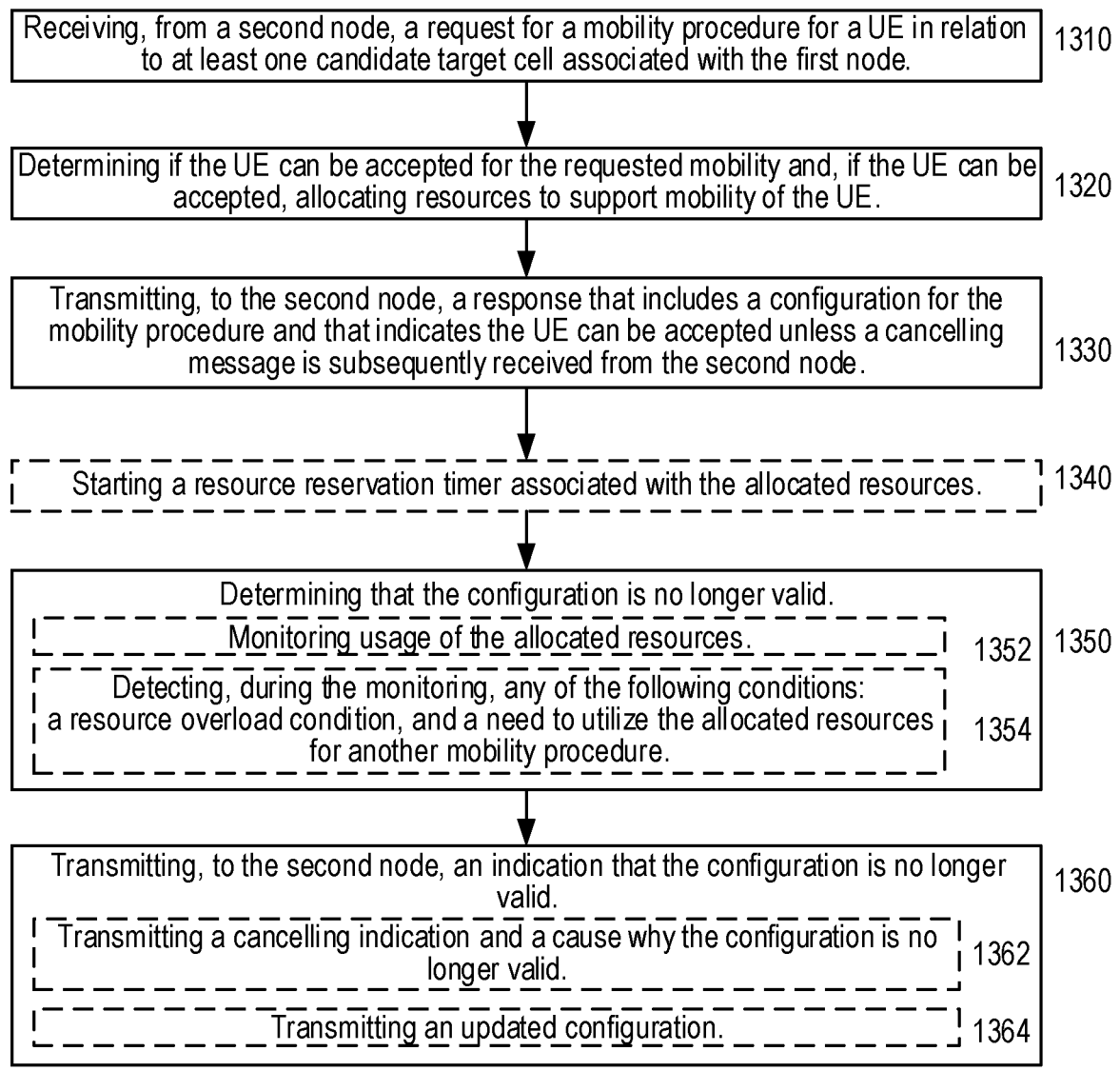
FIGS. 13-15 illustrate exemplary methods (e.g., procedures) performed by source nodes, target nodes, and user equipment (UE), respectively, for conditional mobility in a radio access network (RAN), according to various exemplary embodiments of the present disclosure.

In particular, FIG. 13 illustrates an exemplary method (e.g., procedure) for mobility of a user equipment (UE) served by a second node in the RAN, according to various exemplary embodiments of the present disclosure. The exemplary method shown in FIG. 13 can be performed by a first node (e.g., base station, eNB, gNB, etc.) in the RAN (e.g., E-UTRAN, NG-RAN), such as shown in and/or described in relation to other figures herein. Although the exemplary method is illustrated in FIG. 13 by specific blocks in a particular order, the operations corresponding to the blocks can be performed in different orders than shown and can be combined and/or divided into blocks and/or operations having different functionality than shown. Furthermore, the exemplary method shown in FIG. 13 can be complementary to other exemplary methods disclosed herein (e.g., FIGS. 14-15) such that they can be used cooperatively to provide benefits, advantages, and/or solutions to problems described herein. Optional blocks and/or operations are indicated by dashed lines.

The exemplary method can include the operations of block 1310, where the first node can receive, from the second node, a request for a mobility procedure for the UE in relation to at least one candidate target cell associated with the first node. In various embodiments, the mobility procedure can be any of the following: handover, resume, re-establishment, reconfiguration with synchronization, beam switch, and secondary cell (SCell) addition. For example, the request can be a message such as, or similar to, a conditional handover request, described above.

The exemplary method can also include the operations of block 1320, where the first node can determine if the UE can be accepted for the requested mobility procedure and, if the UE can be accepted, allocating resources to support mobility of the UE. Examples of allocated resources can include bearers, bandwidth, radio resources, power, UL/DL resources in general, C-RNTIs or any other UE identifier, RACH resources (e.g., preambles and/or UL time/frequency resources), etc.

The exemplary method can also include the operations of block 1330, where the first node can transmit, to the second node, a response that includes a configuration for the mobility procedure and that indicates the UE can be accepted unless a cancelling message is subsequently received from the second node. In some embodiments, the configuration can include one or more conditions for triggering UE execution of the mobility procedure. In some embodiments, the response can be an RRCReconfiguration message including a reconfigurationWithSync configuration, or an RRCConnection-Reconfiguration message including a mobilityControlInfo configuration.

In some embodiments, the exemplary method can also include the operations of block 1340, where the first node can start a resource reservation timer associated with the allocated resources (e.g., that were allocated in block 1320). For example, the timer can be stopped upon the reception of a Handover Complete message (e.g., RRCConnection-ReconfigurationComplete or RRCReconfigurationComplete) transmitted by the UE when executing the handover to the target node. The timer can also be stopped upon an indication that the allocated resources are no longer needed, e.g., as indicated by reception of a cancelling message from the source node.

The exemplary method can also include the operations of block 1350, where the first node can determine that the configuration is no longer valid. In some embodiments, this determination can be based on the expiration of the resource reservation timer started in block 1340. In other embodiments, the operations of block 1350 can include the operations of sub-blocks 1352-1354. In sub-block 1352, the first node can monitor usage of the allocated resources (e.g., that were allocated in block 1320). In sub-block 1354, the first node can detect, during the monitoring, any of the following conditions: a resource overload condition; a need to utilize the allocated resources for another mobility procedure (e.g., handover, conditional handover, conditional resume, conditional reestablishment, etc.); and/or other conditions relevant to resource usage.

The exemplary method can also include the operations of block 1360, where the first node can transmit, to the source node, an indication that the configuration is no longer valid. In some embodiments, this operation can include transmitting a cancelling indication and a cause why the configuration is no longer valid (e.g., in sub-block 1362). The cancelling indication can be transmitted in response to the operations of block 1350, such as expiration of the resource reservation timer (e.g., started in block 1340) or detection of certain conditions (e.g., in sub-block 1354).

Figure 11:
FIG. 11 shows an exemplary Conditional Handover Cancel message from a target node to the source node, according to various exemplary embodiments of the present disclosure.

For example, the indication can be transmitted from the first node to the second node as a Conditional Handover Cancel message, such as shown in FIGS. 9 and 11. The message may contain at least some of the information described below, which is further summarized in Table 1:

Message type identifier.
Identifier for the UE-source node relation allocated at the source node, e.g., a source NG-RAN node UE XnAP ID in the case of NG-RAN and the XnAP protocol between source and target nodes. This parameter uniquely identifies a UE over the Xn interface within the source NG-RAN node.
Identifier for the UE-target relation allocated at the target node, e.g., a target NG-RAN node UE XnAP ID in the case of NG-RAN and the XnAP protocol between source and target nodes. This parameter a UE over the Xn interface within the target NG-RAN node.
A cause for the cancelling operation, e.g. expiry of timer, overload, etc. Table 2 below shows an exemplary information element (IE) that provides one possible way of communicating the cause for the cancelling operation, with further definition provided in the following Tables 3-4.

TABLE 1

| IE/Group Name | IE type/section ref. | Semantics description |
|---|---|---|
| Message Type | 9.2.3.1 | |
| Source NG-RAN node UE XnAPID | NG-RAN node UE XnAP ID 9.2.3.16 | Allocated at the source NG-RAN node |
| Target NG-RAN node UE XnAPID | NG-RAN node UE XnAP ID 9.2.3.16 | Allocated at the target NG-RAN node |
| Cause | 9.2.3.2 | |

TABLE 2

| IE/Group Name | IE Type and Reference |
|---|---|
| CHOICE Cause Group | |
| >Radio Network Layer | |
| >>Radio Network Layer Cause | See Table 3 |
| >Transport Layer | |
| >>Transport Layer Cause | ENUMERATED (Transport Resource Unavailable, Unspecified, . . .) |
| >Protocol | |
| >>Protocol Cause | ENUMERATED (Transfer Syntax Error, Abstract Syntax Error (Reject), Abstract Syntax Error (Ignore and Notify), Message not Compatible with Receiver State, Semantic Error, Abstract Syntax Error (Falsely Constructed Message), Unspecified, . . .) |
| >Misc | |
| >>Misc. Cause | ENUMERATED (Control Processing Overload, Hardware Failure, O&M Intervention, Not enough User Plane Processing Resources, Unspecified, . . .) |

TABLE 3

| IE/Group Name | IE Type and Reference |
|---|---|
| >>Radio Network Layer Cause | ENUMERATED (Cell not Available, Handover Desirable for Radio Reasons, Handover Target not Allowed, Invalid AMF Region ID, No Radio Resources Available in Target Cell, |

TABLE 3-continued

| IE/Group Name | IE Type and Reference |
|---|---|
| | Partial Handover, Reduce Load in Serving Cell, Resource Optimisation Handover, Time Critical Handover, $TXn_{RELOCoverall}$ Expiry, $TXn_{RELOCprep}$ Expiry, Unknown GUAMI ID, Unknown Local NG-RAN node UE XnAP ID, Inconsistent Remote NG-RAN node UE XnAP ID, Encryption And/or Integrity Protection Algorithms Not Supported, Protection Algorithms Not Supported, Multiple PDU Session ID Instances, Unknown PDU Session ID, Unknown QoS Flow ID, Multiple QoS Flow ID Instances, Switch Off Ongoing, Not supported 5QI value, $TXn_{DCoverall}$ Expiry, $TXn_{DCprep}$ Expiry, Action Desirable for Radio Reasons, Reduce Load, Resource Optimisation, Time Critical action, Target not Allowed, No Radio Resources Available, Invalid QoS combination, Encryption Algorithms Not Supported, Procedure cancelled, RRM purpose, Improve User Bit Rate, User Inactivity, Radio Connection With UE Lost, Failure in the Radio Interface Procedure, Bearer Option not Supported, UP integrity protection not possible, UP confidentiality protection not possible, Resources not available for the slice, UE Maximum integrity protected data rate reason, Unspecified, . . .) |

TABLE 4

| Radio Network Layer cause | Meaning |
|---|---|
| Cell not Available | The concerned cell is not available. |
| Handover Desirable for Radio Reasons | The reason for requesting handover is radio related. |
| Handover Target not Allowed | Handover to the indicated target cell is not allowed for the UE in question. |
| Invalid AMF Region ID | The target NG-RAN node doesn't belong to the same pool area of the source NG-RAN node, i.e. NG handovers should be attempted instead. |
| No Radio Resources Available in Target Cell | The target cell doesn't have sufficient radio resources available. |
| Partial Handover | Provides a reason for the handover cancellation. The target NG-RAN node did not admit all PDU Sessions included in the HANDOVER REQUEST and the source NG-RAN node estimated service continuity for the UE would be better by not proceeding with handover towards this particular target NG-RAN node. |
| Reduce Load in Serving Cell | Load in serving cell needs to be reduced. When applied to handover preparation, it indicates the handover is triggered due to load balancing. |
| Resource Optimisation Handover | The reason for requesting handover is to improve the load distribution with the neighbour cells. |
| Time Critical Handover | Handover is requested for time critical reason i.e. this cause value is reserved to represent all critical cases where the connection is likely to be dropped if handover is not performed. |
| $TXn_{RELOCoverall}$ Expiry | The reason for the action is expiry of timer $TXn_{RELOCoverall}$. |
| $TXn_{RELOCprep}$ Expiry | Handover Preparation procedure is cancelled when timer $TXn_{RELOCprep}$ expires. |
| Unknown GUAMI ID | The target NG-RAN node belongs to the same AMF Region of the source NG-RAN node and recognizes the AMF Region ID. However, the GUAMI value is unknown to the target NG-RAN node. |
| Unknown Local NG-RAN node UE XnAP ID | The action failed because the receiving NG-RAN node does not recognize the local NG-RAN node UE XnAP ID. |
| Inconsistent Remote NG-RAN node UE XnAP ID | The action failed because the receiving NG-RAN node considers that the received remote NG-RAN node UE XnAP ID is inconsistent.. |
| Encryption and/or Integrity Protection Algorithms Not Supported | The target NG-RAN node is unable to support any of the encryption and/or integrity protection algorithms supported by the UE. |
| Multiple PDU Session ID Instances | The action failed because multiple instances of the same PDU Session had been provided to the NG-RAN node. |
| Unknown PDU Session ID | The action failed because the PDU Session ID is unknown in the NG-RAN node. |
| Unknown QoS Flow ID | The action failed because the QoS Flow ID is unknown in the NG-RAN node. |

TABLE 4-continued

| Radio Network Layer cause | Meaning |
| --- | --- |
| Multiple QoS Flow ID Instances | The action failed because multiple instances of the same QoS flow had been provided to the NG-RAN node. |
| Switch Off Ongoing | The reason for the action is an ongoing switch off i.e. the concerned cell will be switched off after offloading and not be available. It aides the receiving NG-RAN node in taking subsequent actions, e.g. selecting the target cell for subsequent handovers. |
| Not supported 5QI value | The action failed because the requested 5QI is not supported. |
| $TXn_{Dcoverall}$ Expiry | The reason for the action is expiry of timer $TXn_{Dcoverall}$. |
| $TXn_{Dcprep}$ Expiry | The reason for the action is expiry of timer $TXn_{Dcprep}$ |
| Action Desirable for Radio Reasons | The reason for requesting the action is radio related. |
| Reduce Load | Load in the cell(group) served by the requesting node needs to be reduced. |
| Resource Optimisation | The reason for requesting this action is to improve the load distribution with the neighbour cells. |

Additional cause values can also be defined for that canceling message such as:

Target timer expiry: the timer value indicating the validity of target cell resources allocated to the UE in the conditional handover expires; and/or Increased load: the load in target cell e.g. UL and/or DL has increased so that incoming UEs via conditional handover will not be accepted.

In other embodiments, the operation in block 1360 can include transmitting an updated configuration to the UE (e.g., in sub-block 1364). In addition to indicating that the configuration is no longer valid, the updated configuration can override and/or replace the now-invalid configuration. The updated configuration can be transmitted in response to the operations of block 1350, such as expiration of the resource reservation timer (e.g., started in block 1340) or detection of certain conditions (e.g., in sub-block 1354).

Figure 12:
FIG. 12 shows an exemplary Conditional Handover Update message from a target node to the source node, according to various exemplary embodiments of the present disclosure.

In some embodiments, the updated configuration can be transmitted from the first node to the second node as (or in) a Conditional Handover Update message, such as shown in FIGS. 10 and 12. Similar to the cancelling indication discussed above, the update message can contain any of the following information listed below:

Message type identifier.

Identifier for the UE-source node relation allocated at the source node, e.g., a source NG-RAN node UE XnAP ID in the case of NG-RAN and the XnAP protocol between source and target nodes. This parameter uniquely identifies a UE over the Xn interface within the source NG-RAN node.

Identifier for the UE-target relation allocated at the target node, e.g., a target NG-RAN node UE XnAP ID in the case of NG-RAN and the XnAP protocol between source and target nodes. This parameter a UE over the Xn interface within the target NG-RAN node.

An updated list of PDU Session Resources which are admitted for this UE.

An updated list of PDU Session Resources which are not admitted for this UE.

An updated HandoverCommand message reflecting the new condition at the target node/cell.

One or more updated conditions for triggering UE execution of the mobility to procedure.

Table 5 below provides further details about some of these information fields.

TABLE 5

| IE/Group Name | IE type/ section ref. | Semantics description |
| --- | --- | --- |
| Message Type | 9.2.3.1 | |
| Source NG-RAN node UE XnAP ID | NG-RAN node UE XnAP ID 9.2.3.16 | Allocated at the source NG-RAN node |
| Target NG-RAN node UE XnAP ID | NG-RAN node UE XnAP ID 9.2.3.16 | Allocated at the target NG-RAN node |
| PDU Session Resources Admitted List | 9.2.1.2 | |
| PDU Session Resources Not Admitted List | 9.2.1.3 | |
| Target NG-RAN node To Source NG-RAN node Transparent Container | OCTET STRING | Either includes the HandoverCommand message as defined in subclause 10.2.2 of TS 36.331 [14], if the target NG-RAN node is an ng-eNB, or the HandoverCommand message as defined in subclause 11.2.2 of TS 38.331 [10], if the target NG-RAN node is a gNB. |

For example, if the PDU Session Resources Admitted List IE or the PDU Session Resources Not Admitted List IE is contained in the Conditional Handover Update message, the source node should update the list of PDU session resources admitted or not admitted by the target node. When the target node reports the unsuccessful establishment of a PDU session resource, the cause value should be precise enough to enable the source node to know the reason for the unsuccessful establishment. If the Target NG-RAN node To Source NG-RAN node Transparent Container IE (e.g., containing a Handover Command message) is included in the Conditional Handover Update message, the source node should consider that the HandoverCommand message has been updated (e.g., due to load) and should act as defined in 3GPP TS 38.300 (v15.3.1).

Figure 14:
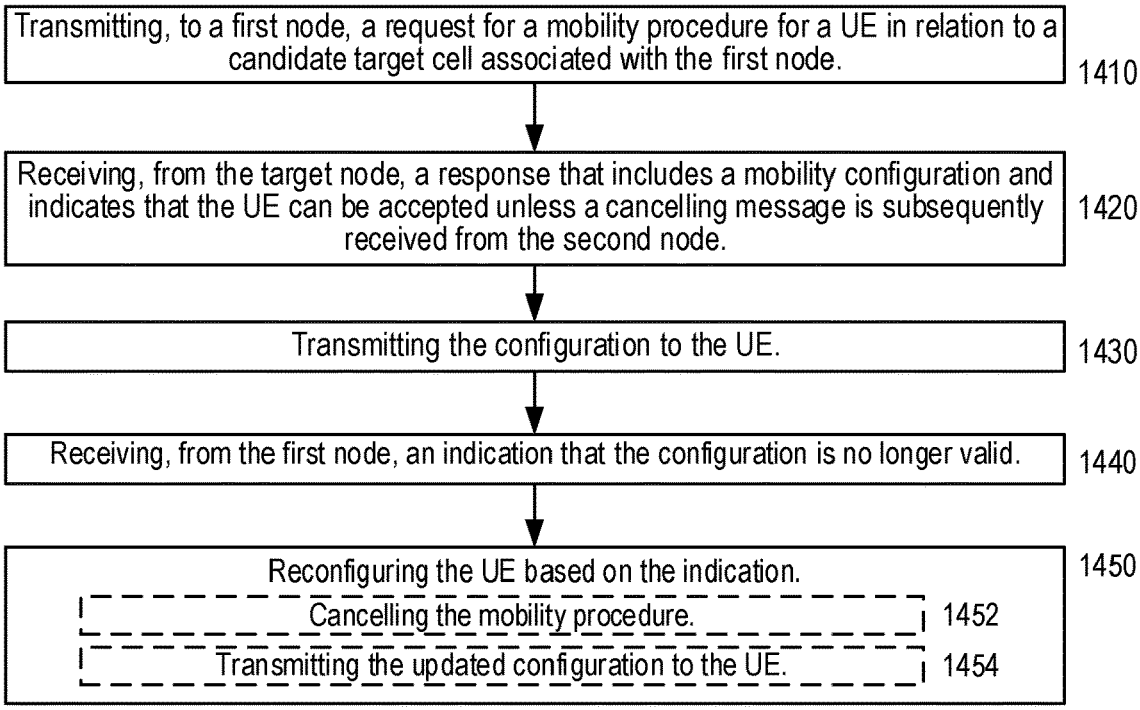

In addition, FIG. 14 illustrates an exemplary method (e.g., procedure) for mobility of a user equipment (UE) served by a second node in the RAN, according to various exemplary embodiments of the present disclosure. This exemplary method can be performed by the second node (e.g., base station, eNB, gNB, etc.) in the RAN (e.g., E-UTRAN, NG-RAN), such as shown in and/or described in relation to other figures herein. Although the exemplary method is illustrated in FIG. 14 by specific blocks in a particular order, the operations corresponding to the blocks can be performed in different orders than shown and can be combined and/or divided into blocks and/or operations having different functionality than shown. Furthermore, the exemplary method shown in FIG. 14 can be complementary to other exemplary methods disclosed herein (e.g., FIGS. 13 and 15) such that they can be used cooperatively to provide benefits, advantages, and/or solutions to problems described herein. Optional blocks and/or operations are indicated by dashed lines.

The exemplary method can include the operations of block 1410, where the second node can transmit, to a first node in the RAN, a request for a mobility procedure for the UE in relation to at least one candidate target cell associated with the first node. In various embodiments, the mobility procedure can be any of the following: handover, resume, re-establishment, reconfiguration with synchronization, beam switch, and secondary cell (SCell) addition. For example, the request can be a message such as, or similar to, a conditional handover request, described above.

The exemplary method can also include the operations of block 1420, where the second node can receive, from the first node, a response that includes a configuration for the mobility procedure and that indicates the UE can be accepted unless a cancelling message is subsequently received from the second node. In some embodiments, the configuration can include one or more conditions for triggering UE execution of the mobility procedure. For example, an exemplary condition can be that the quality of the target cell becomes X dB stronger than the UE's serving cell associated with the second node. In some embodiments, the response can be an RRCReconfiguration message including a reconfigurationWithSync configuration, or an RRCConnection-Reconfiguration message including a mobilityControlInfo configuration.

The exemplary method can also include the operations of block 1430-1450. In block 1430, the second node can transmit the configuration to the UE. In block 1440, the second node can receive, from the first node, an indication that the configuration is no longer valid. In block 1450, the second node can reconfigure the UE based on the indication.

In some embodiments, the indication that the configuration is no longer valid can include a cancelling indication and a cause why the configuration is no longer valid. For example, the cancelling indication can be received as a Conditional Handover Cancel message, such as shown in FIGS. 9 and 11 and described above. In such embodiments, the operations of block 1450 can include the operations of sub-block 1452, where the second node can cancel the mobility procedure. For example, cancelling the mobility procedure can include sending the UE a Conditional Handover Cancelled message, such as shown in FIG. 9.

In other embodiments, the indication that the configuration is no longer valid can include an updated configuration for the mobility procedure. For example, the updated configuration can be received as (or in) a Conditional Handover Update message, such as shown in FIGS. 10 and 12 and described above. In such embodiments, the operations of block 1450 can include the operations of sub-block 1454, where the second node can transmit the updated configuration to the UE. For example, the update can be sent to the UE as a Conditional Handover Updated message, such as shown in FIG. 10. In some embodiments, the update can utilize delta signalling to modify, add, and/or remove specific fields and/or IEs of the previously provided conditional handover configuration.

In various embodiments, the updated configuration can include any of the following:
- updated list of PDU session resources for the UE that are admitted by the first node;
- updated list of PDU session resources for the UE that are not admitted by the first node;
- updated HandoverCommand message related to current operating conditions of the candidate target cell; and
- one or more updated conditions for triggering UE execution of the mobility procedure.

Figure 15:
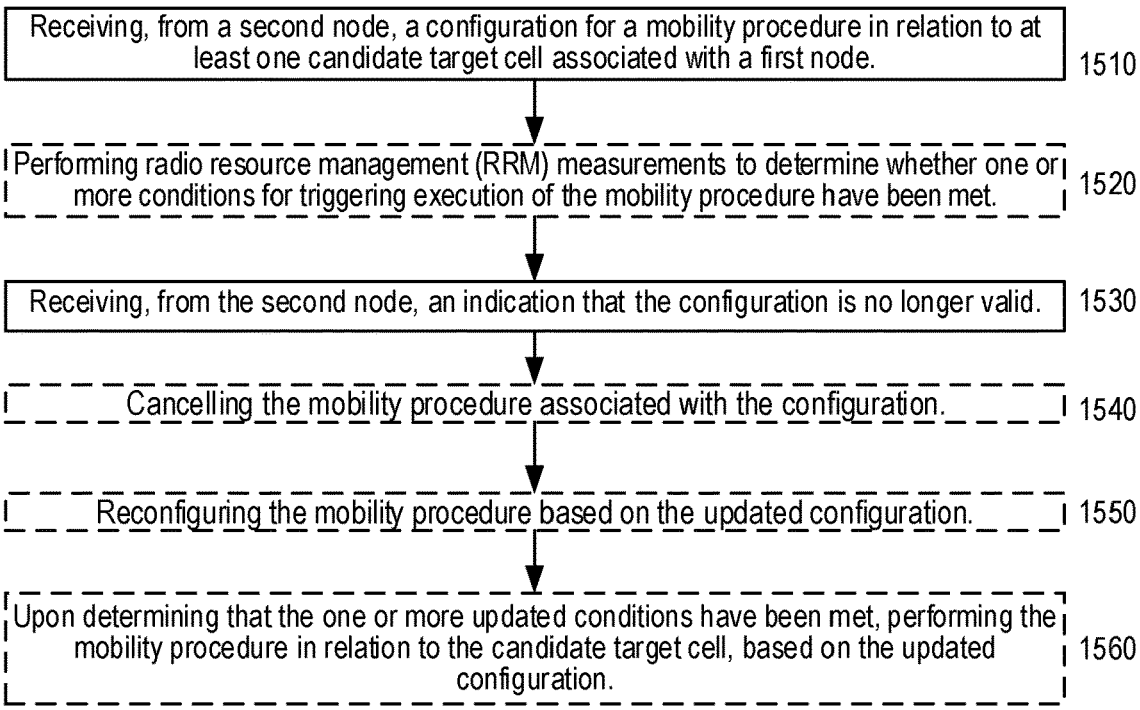

In addition, FIG. 15 illustrates an exemplary method (e.g., procedure) performed by a user equipment (UE, e.g., wireless device) served by a second node in a radio access network (RAN), according to various exemplary embodiments of the present disclosure. This exemplary method can be performed by a UE such as shown in and/or described in relation to other figures herein. Although the exemplary method is illustrated in FIG. 15 by specific blocks in a particular order, the operations corresponding to the blocks can be performed in different orders than shown and can be combined and/or divided into blocks having different functionality than shown. Furthermore, the exemplary method shown in FIG. 15 can be complementary to other exemplary methods disclosed herein (e.g., FIGS. 13-14) such that they can be used cooperatively to provide benefits, advantages, and/or solutions to problems described herein. Optional blocks and/or operations are indicated by dashed lines.

The exemplary method can include the operations of block 1510, where the UE can receive, from the second node (e.g., associated with the UE's serving cell), a configuration for a mobility procedure in relation to at least one candidate target cell associated with a first node in the RAN. In various embodiments, the mobility procedure can be any of the following: handover, resume, re-establishment, reconfiguration with synchronization, beam switch, and SCell addition. In some embodiments, the configuration can include one or more conditions for triggering execution of the mobility procedure. For example, an exemplary condition can be that the quality of the candidate target cell (or beam) becomes X dB stronger than the UE's serving cell.

In some embodiments, the exemplary method can also include the operations of block 1520, where the UE can perform radio resource management (RRM) measurements (e.g., of reference signals) to determine whether the one or more conditions for triggering execution of the mobility procedure have been met have been met. The exemplary method can also include the operations of block 1530, where the UE can receive from the second node, before the one or more conditions have been met, an indication that the configuration is no longer valid.

In some embodiments, the indication that the configuration is no longer valid includes a cancelling indication and a cause why the configuration is no longer valid. For example, the indication can be received as (or in) a Conditional Handover Cancelled message, such as shown in FIG. 9 and described above. In such embodiments, the exemplary method can also include the operations of block 1540, where the UE can cancel the mobility procedure associated with the configuration. For example, in response to a Conditional Handover Cancelled message, the UE can stop handover-related actions toward the target node, such as measurement, monitoring of the execution trigger condition, etc.

In other embodiments, the indication that the configuration is no longer valid can include an updated configuration for the mobility procedure. For example, the updated configuration can be received as (or in) a Conditional Handover Updated message, such as shown in FIG. 10 and described above. In some embodiments, the updated configuration can incorporate and/or utilize delta signalling to modify, add, and/or remove specific fields and/or IEs in relation to the previously provided configuration. In such embodiments, the exemplary method can also include the operations of sub-block 1550, where the UE can reconfigure the mobility procedure associated with the configuration (e.g., in response to the Conditional Handover Updated message).

In various embodiments, the updated configuration can include any of the following:
- updated list of PDU session resources for the UE that are admitted by the first node;
- updated list of PDU session resources for the UE that are not admitted by the first node;
- updated HandoverCommand message related to current operating conditions of the candidate target cell; and
- one or more updated conditions for triggering UE execution of the mobility procedure.

In some of these embodiments, the exemplary method can also include the operations of block 1560, where the UE can, based on determining that the one or more updated conditions have been met, perform the mobility procedure in relation to the candidate target cell, based on the updated configuration.

In some embodiments, the update can be received in response to expiration of the resource reservation timer set by the target node, as described above. In other embodiments, the update can be received in response to the target node detecting a condition while monitoring the usage of its resources, as described above. For example, this can include detection of any of the following: an overload condition; the need to utilize the allocated resources for other handover, conditional handover, or other conditional mobility operations (e.g. conditional resume, conditional re-establishment, etc.); and/or other conditions relevant to resource usage.

Figure 16:
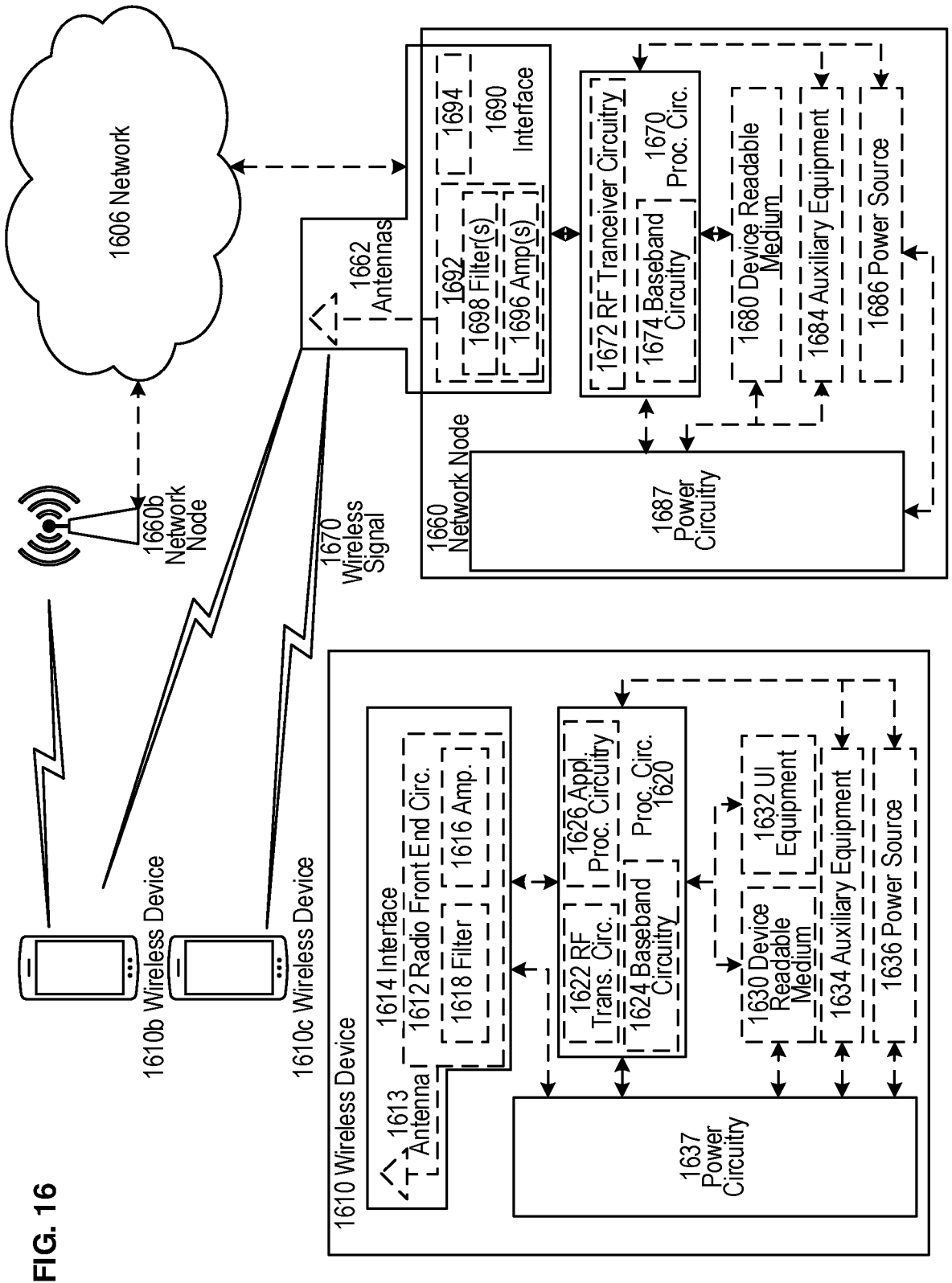
FIG. 16 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 16. For simplicity, the wireless network of FIG. 16 only depicts network 1606, network nodes 1660 and 1660b, and WDs 1610, 1610b, and 1610c. In practice, a wireless network can further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 16 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1660 are depicted as single boxes located within a larger box, or nested within multiple boxes, in practice, a network node can comprise multiple different physical components that make up a single illustrated component (e.g., device readable medium 1680 can comprise multiple separate hard drives as well as multiple RAM modules).

Similarly, network node 1660 can be composed of multiple physically separate components (e.g., a NodeB component and a RNC component, or a BTS component and a BSC component, etc.), which can each have their own respective components. In certain scenarios in which network node 1660 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1660 can be configured to support multiple radio access technologies (RATs). In such embodiments, some components can be duplicated (e.g., separate device readable medium 1680 for the different RATs) and some components can be reused (e.g., the same antenna 1662 can be shared by the RATs). Network node 1660 can also include multiple sets of the various illustrated components for different wireless technologies integrated into network node 1660, such as, for example, GSM, WCDMA, LTE, NR, WiFi, or Bluetooth wireless technologies. These wireless technologies can be integrated into the same or different chip or set of chips and other components within network node 1660.

Processing circuitry 1670 can be configured to perform any determining, calculating, or similar operations (e.g., certain obtaining operations) described herein as being provided by a network node. These operations performed by processing circuitry 1670 can include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components (e.g., device readable medium 1680) various functionality of network node 1660. Such functionality can include providing any of the various wireless features, functions, or benefits discussed herein.

For example, processing circuitry 1670 can execute instructions stored in device readable medium 1680 or in memory within processing circuitry 1670. In some embodiments, processing circuitry 1670 can include a system on a chip (SOC). As a more specific example, instructions (also referred to as a computer program product) stored in medium 1680 can include instructions that, when executed by processor 1670, can configure network node 1660 to perform operations corresponding to various exemplary methods (e.g., procedures) described herein.

In some embodiments, processing circuitry 1670 can include one or more of radio frequency (RF) transceiver circuitry 1672 and baseband processing circuitry 1674. In some embodiments, radio frequency (RF) transceiver circuitry 1672 and baseband processing circuitry 1674 can be on separate chips (or sets of chips), boards, or units, such as radio units and digital units. In alternative embodiments, part or all of RF transceiver circuitry 1672 and baseband processing circuitry 1674 can be on the same chip or set of chips, boards, or units In certain embodiments, some or all of the functionality described herein as being provided by a network node, base station, eNB or other such network device can be performed by processing circuitry 1670 executing instructions stored on device readable medium 1680 or memory within processing circuitry 1670. In alternative embodiments, some or all of the functionality can be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1670. Device readable medium 1680 can store any suitable instructions, data or information, including a computer program, software, an application including one or more of logic, rules, code, tables, etc. and/or other instructions capable of being executed by processing circuitry 1670 and, utilized by network node 1660. Device readable medium 1680 can be used to store any calculations made by processing circuitry 1670 and/or any data received via interface 1690. In some embodiments, processing circuitry 1670 and device readable medium 1680 can be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that can be coupled to, or in certain embodiments a part of, antenna 1662. Radio front end circuitry 1692 comprises filters 1698 and amplifiers 1696. Radio front end circuitry 1692 can be connected to antenna 1662 and processing circuitry 1670. Radio front end circuitry can be configured to condition signals communicated between antenna 1662 and processing circuitry 1670. Radio front end circuitry 1692 can receive digital data that is to be sent out to other network nodes or WDs via a wireless connection. Radio front end circuitry 1692 can convert the digital data into a radio signal having the appropriate channel and bandwidth parameters using a combination of filters 1698 and/or amplifiers 1696. The radio signal can then be transmitted via antenna 1662. Similarly, when receiving data, antenna 1662 can collect radio signals which are then converted into digital data by radio front end circuitry 1692.

The digital data can be passed to processing circuitry 1670. In other embodiments, the interface can comprise different components and/or different combinations of components.

In certain alternative embodiments, network node 1660 may not include separate radio front end circuitry 1692, instead, processing circuitry 1670 can comprise radio front end circuitry and can be connected to antenna 1662 without separate radio front end circuitry 1692. Similarly, in some embodiments, all or some of RF transceiver circuitry 1672 can be considered a part of interface 1690. In still other embodiments, interface 1690 can include one or more ports or terminals 1694, radio front end circuitry 1692, and RF transceiver circuitry 1672, as part of a radio unit (not shown), and interface 1690 can communicate with baseband processing circuitry 1674, which is part of a digital unit (not shown).

Antenna 1662 can include one or more antennas, or antenna arrays, configured to send and/or receive wireless signals. Antenna 1662 can be coupled to radio front end circuitry 1690 and can be any type of antenna capable of transmitting and receiving data and/or signals wirelessly. In some embodiments, antenna 1662 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1662 can be separate from network node 1660 and can be connectable to network node 1660 through an interface or port.

Antenna 1662, interface 1690, and/or processing circuitry 1670 can be configured to perform any receiving operations and/or certain obtaining operations described herein as being performed by a network node. Any information, data and/or signals can be received from a wireless device, another network node and/or any other network equipment. Similarly, antenna 1662, interface 1690, and/or processing circuitry 1670 can be configured to perform any transmitting operations described herein as being performed by a network node. Any information, data and/or signals can be transmitted to a wireless device, another network node and/or any other network equipment.

Power circuitry 1687 can comprise, or be coupled to, power management circuitry and can be configured to supply the components of network node 1660 with power for performing the functionality described herein. Power circuitry 1687 can receive power from power source 1686. Power source 1686 and/or power circuitry 1687 can be configured to provide power to the various components of network node 1660 in a form suitable for the respective components (e.g., at a voltage and current level needed for each respective component). Power source 1686 can either be included in, or external to, power circuitry 1687 and/or network node 1660. For example, network node 1660 can be connectable to an external power source (e.g., an electricity outlet) via an input circuitry or interface such as an electrical cable, whereby the external power source supplies power to power circuitry 1687. As a further example, power source 1686 can comprise a source of power in the form of a battery or battery pack which is connected to, or integrated in, power circuitry 1687. The battery can provide backup power should the external power source fail. Other types of power sources, such as photovoltaic devices, can also be used.

Alternative embodiments of network node 1660 can include additional components beyond those shown in FIG. 16 that can be responsible for providing certain aspects of the network node's functionality, including any of the functionality described herein and/or any functionality necessary to support the subject matter described herein. For example, network node 1660 can include user interface equipment to allow and/or facilitate input of information into network node 1660 and to allow and/or facilitate output of information from network node 1660. This can allow and/or facilitate a user to perform diagnostic, maintenance, repair, and other administrative functions for network node 1660.

In some embodiments, a WD (e.g., WD 1610) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, WD 1610 includes antenna 1611, interface 1614, processing circuitry 1620, device readable medium 1630, user interface equipment 1632, auxiliary equipment 1634, power source 1636 and power circuitry 1637. WD 1610 can include multiple sets of one or more of the illustrated components for different wireless technologies supported by WD 1610, such as, for example, GSM, WCDMA, LTE, NR, WiFi, WiMAX, or Bluetooth wireless technologies, just to mention a few. These wireless technologies can be integrated into the same or different chips or set of chips as other components within WD 1610.

Antenna 1611 can include one or more antennas or antenna arrays, configured to send and/or receive wireless signals, and is connected to interface 1614. In certain alternative embodiments, antenna 1611 can be separate from WD 1610 and be connectable to WD 1610 through an interface or port. Antenna 1611, interface 1614, and/or processing circuitry 1620 can be configured to perform any receiving or transmitting operations described herein as being performed by a WD. Any information, data and/or signals can be received from a network node and/or another WD. In some embodiments, radio front end circuitry and/or antenna 1611 can be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and can be configured to condition signals communicated between antenna 1611 and processing circuitry 1620. Radio front end circuitry 1612 can be coupled to or a part of antenna 1611. In some embodiments, WD 1610 may not include separate radio front end circuitry 1612; rather, processing circuitry 1620 can comprise radio front end circuitry and can be connected to antenna 1611. Similarly, in some embodiments, some or all of RF transceiver circuitry 1622 can be considered a part of interface 1614. Radio front end circuitry 1612 can receive digital data that is to be sent out to other network nodes or WDs via a wireless connection. Radio front end circuitry 1612 can convert the digital data into a radio signal having the appropriate channel and bandwidth parameters using a combination of filters 1618 and/or amplifiers 1616. The radio signal can then be transmitted via antenna 1611. Similarly, when receiving data, antenna 1611 can collect radio signals which are then converted into digital data by radio front end circuitry 1612. The digital data can be passed to processing circuitry 1620. In other embodiments, the interface can comprise different components and/or different combinations of components.

Processing circuitry 1620 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality can include providing any of the various wireless features or benefits discussed herein.

For example, processing circuitry 1620 can execute instructions stored in device readable medium 1630 or in memory within processing circuitry 1620 to provide the functionality disclosed herein. For example, instructions (also referred to as a computer program product) stored in medium 1630 can include instructions that, when executed by processor 1620, can configure wireless device 1610 to perform operations corresponding to various exemplary methods (e.g., procedures) described herein.

As illustrated, processing circuitry 1620 includes one or more of RF transceiver circuitry 1622, baseband processing circuitry 1624, and application processing circuitry 1626. In other embodiments, the processing circuitry can comprise different components and/or different combinations of components. In certain embodiments processing circuitry 1620 of WD 1610 can comprise a SOC. In some embodiments, RF transceiver circuitry 1622, baseband processing circuitry 1624, and application processing circuitry 1626 can be on separate chips or sets of chips. In alternative embodiments, part or all of baseband processing circuitry 1624 and application processing circuitry 1626 can be combined into one chip or set of chips, and RF transceiver circuitry 1622 can be on a separate chip or set of chips. In still alternative embodiments, part or all of RF transceiver circuitry 1622 and baseband processing circuitry 1624 can be on the same chip or set of chips, and application processing circuitry 1626 can be on a separate chip or set of chips. In yet other alternative embodiments, part or all of RF transceiver circuitry 1622, baseband processing circuitry 1624, and application processing circuitry 1626 can be combined in the same chip or set of chips. In some embodiments, RF transceiver circuitry 1622 can be a part of interface 1614. RF transceiver circuitry 1622 can condition RF signals for processing circuitry 1620.

In certain embodiments, some or all of the functionality described herein as being performed by a WD can be provided by processing circuitry 1620 executing instructions stored on device readable medium 1630, which in certain embodiments can be a computer-readable storage medium. In alternative embodiments, some or all of the functionality can be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 can be configured to perform any determining, calculating, or similar operations (e.g., certain obtaining operations) described herein as being performed by a WD. These operations, as performed by processing circuitry 1620, can include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 can be operable to store a computer program, software, an application including one or more of logic, rules, code, tables, etc. and/or other instructions capable of being executed by processing circuitry 1620. Device readable medium 1630 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1620. In some embodiments, processing circuitry 1620 and device readable medium 1630 can be considered to be integrated.

User interface equipment 1632 can include components that allow and/or facilitate a human user to interact with WD 1610. Such interaction can be of many forms, such as visual, audial, tactile, etc. User interface equipment 1632 can be operable to produce output to the user and to allow and/or facilitate the user to provide input to WD 1610. The type of interaction can vary depending on the type of user interface equipment 1632 installed in WD 1610. For example, if WD 1610 is a smart phone, the interaction can be via a touch screen; if WD 1610 is a smart meter, the interaction can be through a screen that provides usage (e.g., the number of gallons used) or a speaker that provides an audible alert (e.g., if smoke is detected). User interface equipment 1632 can include input interfaces, devices and circuits, and output interfaces, devices and circuits. User interface equipment 1632 can be configured to allow and/or facilitate input of information into WD 1610, and is connected to processing circuitry 1620 to allow and/or facilitate processing circuitry 1620 to process the input information. User interface equipment 1632 can include, for example, a microphone, a proximity or other sensor, keys/buttons, a touch display, one or more cameras, a USB port, or other input circuitry. User interface equipment 1632 is also configured to allow and/or facilitate output of information from WD 1610, and to allow and/or facilitate processing circuitry 1620 to output information from WD 1610. User interface equipment 1632 can include, for example, a speaker, a display, vibrating circuitry, a USB port, a headphone interface, or other output circuitry. Using one or more input and output interfaces, devices, and circuits, of user interface equipment 1632, WD 1610 can communicate with end users and/or the wireless network, and allow and/or facilitate them to benefit from the functionality described herein.

Auxiliary equipment 1634 is operable to provide more specific functionality which may not be generally performed by WDs. This can comprise specialized sensors for doing measurements for various purposes, interfaces for additional types of communication such as wired communications etc. The inclusion and type of components of auxiliary equipment 1634 can vary depending on the embodiment and/or scenario.

Power source 1636 can, in some embodiments, be in the form of a battery or battery pack. Other types of power sources, such as an external power source (e.g., an electricity outlet), photovoltaic devices or power cells, can also be used. WD 1610 can further comprise power circuitry 1637 for delivering power from power source 1636 to the various parts of WD 1610 which need power from power source 1636 to carry out any functionality described or indicated herein. Power circuitry 1637 can in certain embodiments comprise power management circuitry. Power circuitry 1637 can additionally or alternatively be operable to receive power from an external power source; in which case WD 1610 can be connectable to the external power source (such as an electricity outlet) via input circuitry or an interface such as an electrical power cable. Power circuitry 1637 can also in certain embodiments be operable to deliver power from an external power source to power source 1636. This can be, for example, for the charging of power source 1636. Power circuitry 1637 can perform any converting or other modification to the power from power source 1636 to make it suitable for supply to the respective components of WD 1610.

Figure 17:
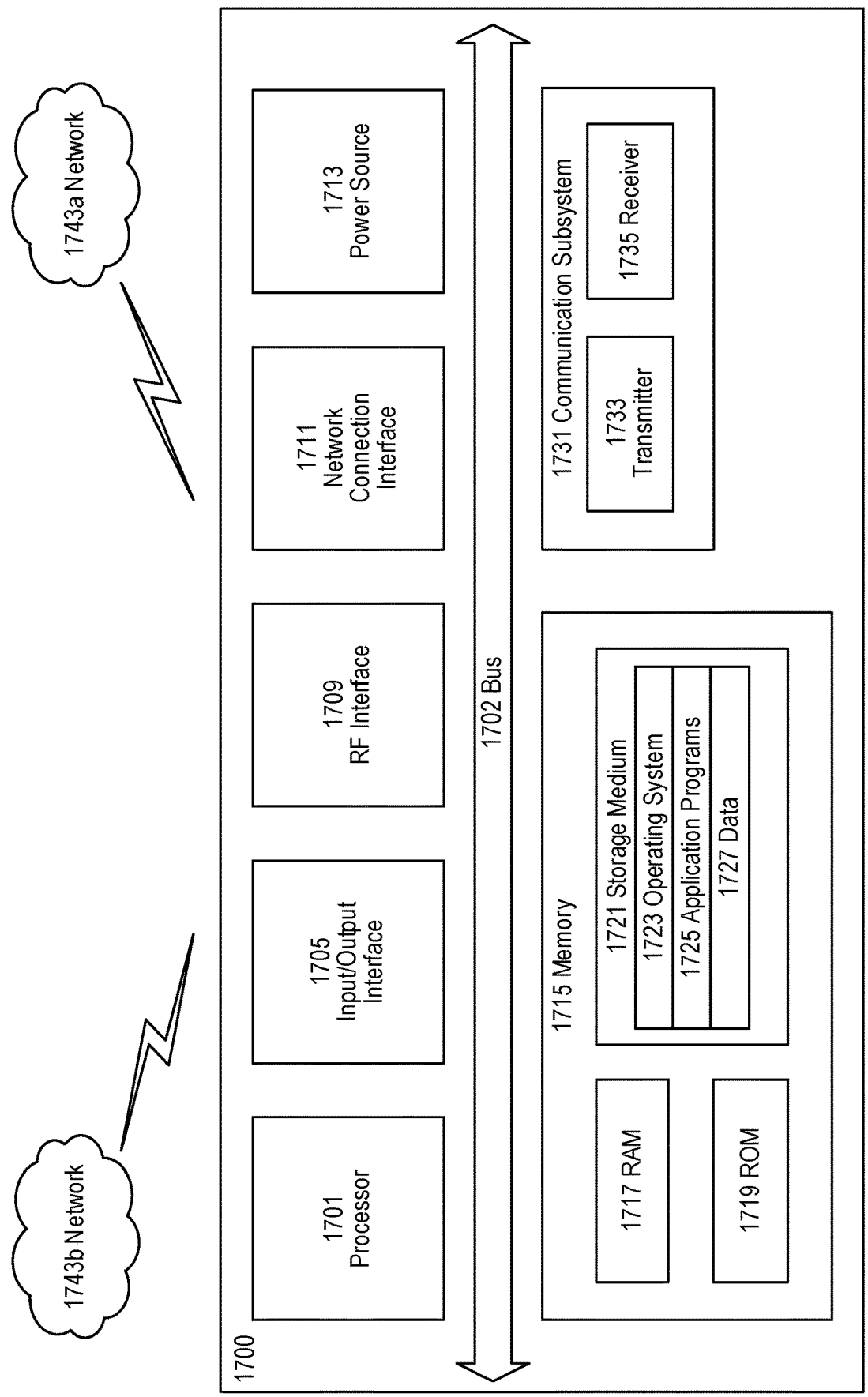
FIG. 17 illustrates an exemplary embodiment of a UE, in accordance with various aspects described herein.

FIG. 17 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 17200 can be any UE identified by 3GPP, including a NB-IoT UE, a machine type communication (MTC) UE, and/or an enhanced MTC (eMTC) UE. UE 1700, as illustrated in FIG. 17, is one example of a WD configured for communication in accordance with one or more communication standards promulgated by 3GPP, such as 3GPP's GSM, UMTS, LTE, and/or 5G standards. As mentioned previously, the term WD and UE can be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725 (e.g., including executable instructions corresponding to operations of any of the exemplary methods disclosed herein), and data 1727. In other embodiments, storage medium 1721 can include other similar types of information. Certain UEs can utilize all of the components shown in FIG. 17, or only a subset of the components. The level of integration between the components can vary from one UE to another UE. Further, certain UEs can contain multiple instances of a component, such as multiple processors, memories, transceivers, transmitters, receivers, etc.

In FIG. 17, processing circuitry 1701 can be configured to process computer instructions and data. Processing circuitry 1701 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 can include two central processing units (CPUs). Data can be information in a form suitable for use by a computer.

In the depicted embodiment, input/output interface 1705 can be configured to provide a communication interface to an input device, output device, or input and output device. UE 1700 can be configured to use an output device via input/output interface 1705. An output device can use the same type of interface port as an input device. For example, a USB port can be used to provide input to and output from UE 1700. The output device can be a speaker, a sound card, a video card, a display, a monitor, a printer, an actuator, an emitter, a smartcard, another output device, or any combination thereof. UE 1700 can be configured to use an input device via input/output interface 1705 to allow and/or facilitate a user to capture information into UE 1700. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 17, RF interface 1709 can be configured to provide a communication interface to RF components such as a transmitter, a receiver, and an antenna. Network connection interface 1711 can be configured to provide a communication interface to network 1743a. Network 1743a can encompass wired and/or wireless networks such as a local-area network (LAN), a wide-area network (WAN), a computer network, a wireless network, a telecommunications network, another like network or any combination thereof. For example, network 1743a can comprise a Wi-Fi network. Network connection interface 1711 can be configured to include a receiver and a transmitter interface used to communicate with one or more other devices over a communication network according to one or more communication protocols, such as Ethernet, TCP/IP, SONET, ATM, or the like. Network connection interface 1711 can implement receiver and transmitter functionality appropriate to the communication network links (e.g., optical, electrical, and the like). The transmitter and receiver functions can share circuit components, software or firmware, or alternatively can be implemented separately.

RAM 1717 can be configured to interface via bus 1702 to processing circuitry 1701 to provide storage or caching of data or computer instructions during the execution of software programs such as the operating system, application programs, and device drivers. ROM 1719 can be configured to provide computer instructions or data to processing circuitry 1701. For example, ROM 1719 can be configured to store invariant low-level system code or data for basic system functions such as basic input and output (I/O), startup, or reception of keystrokes from a keyboard that are stored in a non-volatile memory. Storage medium 1721 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1721 can be configured to include operating system 1723; application program 1725 such as a web browser application, a widget or gadget engine or another application; and data file 1727. Storage medium 1721 can store, for use by UE 1700, any of a variety of various operating systems or combinations of operating systems. For example, application program 1725 can include executable program instructions (also referred to as a computer program product) that, when executed by processor 1701, can configure UE 1700 to perform operations corresponding to various exemplary methods (e.g., procedures) described herein.

Storage medium 1721 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 can allow and/or facilitate UE 1700 to access computer-executable instructions, application programs or the like, stored on transitory or non-transitory memory media, to off-load data, or to upload data. An article of manufacture, such as one utilizing a communication system can be tangibly embodied in storage medium 1721, which can comprise a device readable medium.

In FIG. 17, processing circuitry 1701 can be configured to communicate with network 1743b using communication subsystem 1731. Network 1743a and network 1743b can be the same network or networks or different network or networks. Communication subsystem 1731 can be configured to include one or more transceivers used to communicate with network 1743b. For example, communication subsystem 1731 can be configured to include one or more transceivers used to communicate with one or more remote transceivers of another device capable of wireless communication such as another WD, UE, or base station of a radio access network (RAN) according to one or more communication protocols, such as IEEE 802.17, CDMA, WCDMA, GSM, LTE, UTRAN, WiMax, or the like. Each transceiver can include transmitter 1733 and/or receiver 1735 to implement transmitter or receiver functionality, respectively, appropriate to the RAN links (e.g., frequency allocations and the like). Further, transmitter 1733 and receiver 1735 of each transceiver can share circuit components, software or firmware, or alternatively can be implemented separately.

In the illustrated embodiment, the communication functions of communication subsystem 1731 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 can include cellular communication, Wi-Fi communication, Bluetooth communication, and GPS communication. Network 1743b can encompass wired and/or wireless networks such as a local-area network (LAN), a wide-area network (WAN), a computer network, a wireless network, a telecommunications network, another like network or any combination thereof. For example, network 1743b can be a cellular network, a Wi-Fi network, and/or a near-field network. Power source 1713 can be configured to provide alternating current (AC) or direct current (DC) power to components of UE 1700.

The features, benefits and/or functions described herein can be implemented in one of the components of UE 1700 or partitioned across multiple components of UE 1700. Further, the features, benefits, and/or functions described herein can be implemented in any combination of hardware, software or firmware. In one example, communication subsystem 1731 can be configured to include any of the components described herein. Further, processing circuitry 1701 can be configured to communicate with any of such components over bus 1702. In another example, any of such components can be represented by program instructions stored in memory that when executed by processing circuitry 1701 perform the corresponding functions described herein. In another example, the functionality of any of such components can be partitioned between processing circuitry 1701 and communication subsystem 1731. In another example, the non-computationally intensive functions of any of such components can be implemented in software or firmware and the computationally intensive functions can be implemented in hardware.

Figure 18:
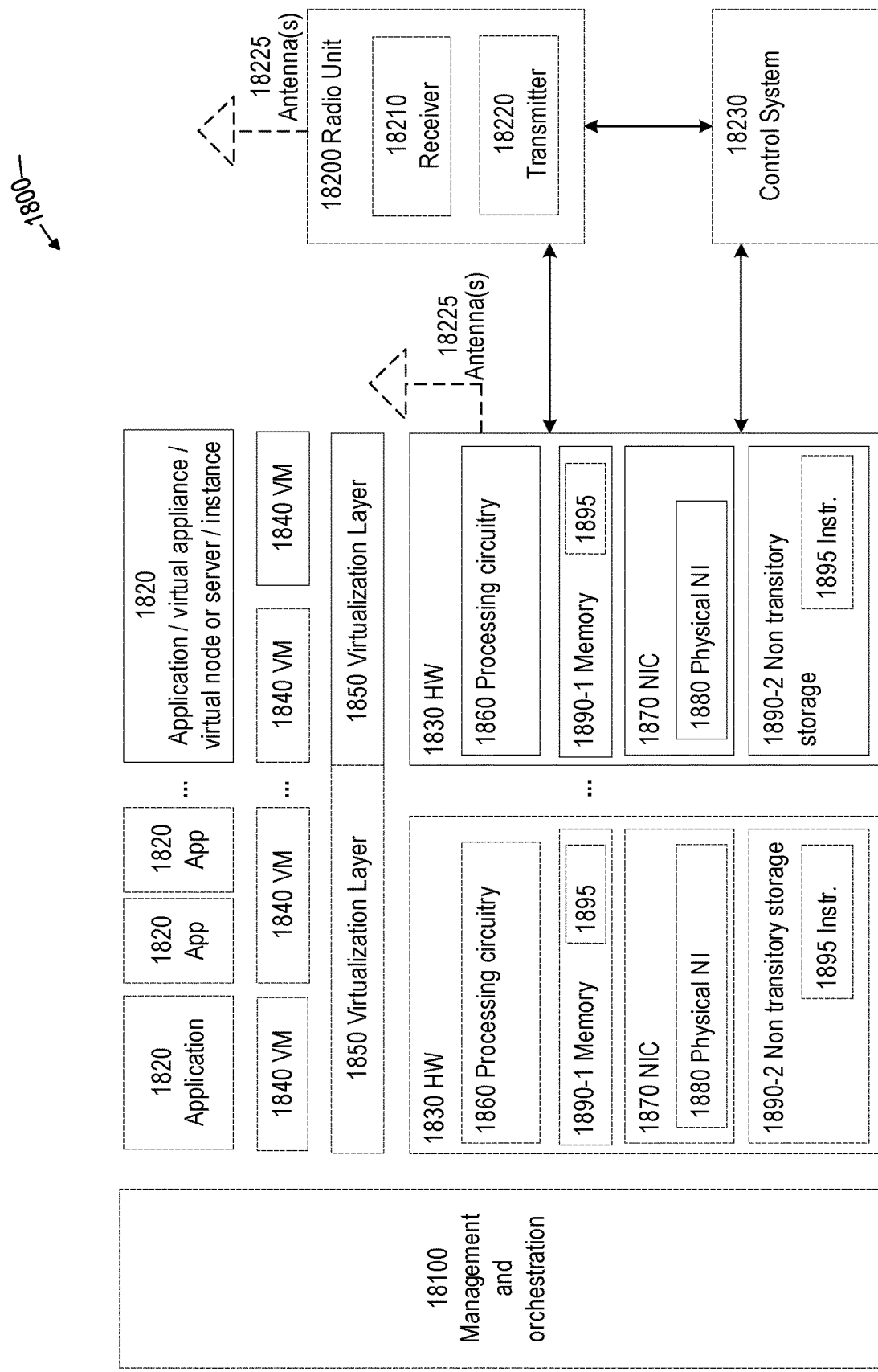
FIG. 18 is a block diagram illustrating an exemplary virtualization environment usable for implementation of various embodiments of network nodes described herein.

FIG. 18 is a schematic block diagram illustrating a virtualization environment 1800 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node can be entirely virtualized.

The functions can be implemented by one or more applications 1820 (which can alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which can be commercial off-the-shelf (COTS) processors, dedicated Application Specific Integrated Circuits (ASICs), or any other type of processing circuitry including digital or analog hardware components or special purpose processors. Each hardware device can comprise memory 1890-1 which can be non-persistent memory for temporarily storing instructions 1895 or software executed by processing circuitry 1860. For example, instructions 1895 can include program instructions (also referred to as a computer program product) that, when executed by processing circuitry 1860, can configure hardware node 1820 to perform operations corresponding to various exemplary methods (e.g., procedures) described herein. Such operations can also be attributed to virtual node(s) 1820 that is/are hosted by hardware node 1830.

Each hardware device can comprise one or more network interface controllers (NICs) 1870, also known as network interface cards, which include physical network interface 1880. Each hardware device can also include non-transitory, persistent, machine-readable storage media 1890-2 having stored therein software 1895 and/or instructions executable by processing circuitry 1860. Software 1895 can include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and can be run by a corresponding virtualization layer 1850 or hypervisor. Different embodiments of the instance of virtual appliance 1820 can be implemented on one or more of virtual machines 1840, and the implementations can be made in different ways.

During operation, processing circuitry 1860 executes software 1895 to instantiate the hypervisor or virtualization layer 1850, which can sometimes be referred to as a virtual machine monitor (VMM). Virtualization layer 1850 can present a virtual operating platform that appears like networking hardware to virtual machine 1840.

As shown in FIG. 18, hardware 1830 can be a standalone network node with generic or specific components. Hardware 1830 can comprise antenna 18225 and can implement some functions via virtualization. Alternatively, hardware 1830 can be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1840 can be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 can be coupled to one or more antennas 18225. Radio units 18200 can communicate directly with hardware nodes 1830 via one or more appropriate network interfaces and can be used in combination with the virtual components to provide a virtual node with radio capabilities, such as a radio access node or a base station.

In some embodiments, some signalling can be effected with the use of control system 18230 which can alternatively be used for communication between the hardware nodes 1830 and radio units 18200.

Figure 19:
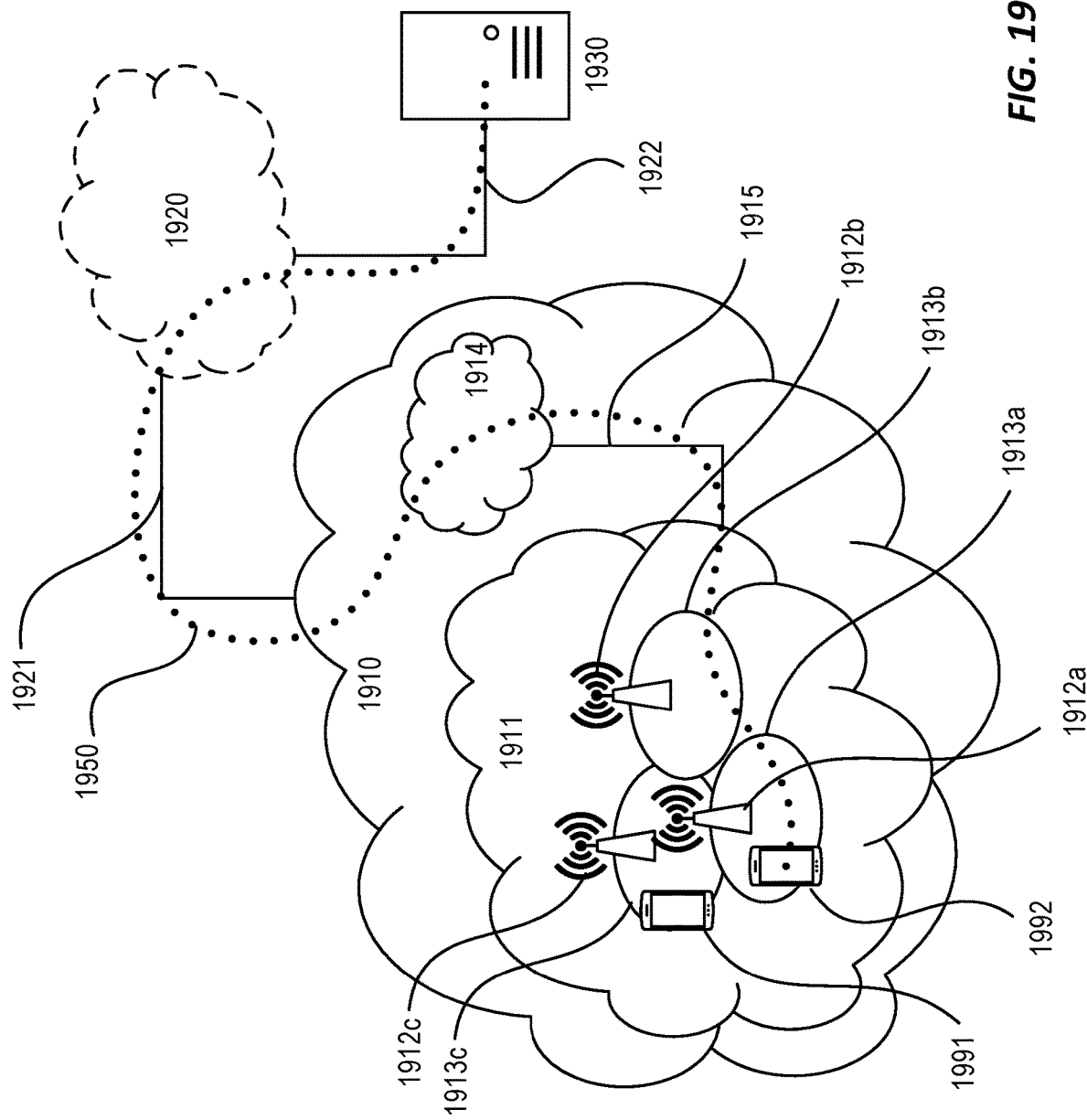
FIGS. 19-20 are block diagrams of various exemplary communication systems and/or networks, according to various exemplary embodiments of the present disclosure.

With reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991 located in coverage area 1913c can be configured to wirelessly connect to, or be paged by, the corresponding base station 1912c. A second UE 1992 in coverage area 1913a is wirelessly connectable to the corresponding base station 1912*a*. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which can be embodied in the hardware and/or software of a standalone server, a cloud-implemented server, a distributed server or as processing resources in a server farm. Host computer 1930 can be under the ownership or control of a service provider or can be operated by the service provider or on behalf of the service provider. Connections 1921 and 1922 between telecommunication network 1910 and host computer 1930 can extend directly from core network 1914 to host computer 1930 or can go via an optional intermediate network 1920. Intermediate network 1920 can be one of, or a combination of more than one of, a public, private or hosted network; intermediate network 1920, if any, can be a backbone network or the Internet; in particular, intermediate network 1920 can comprise two or more sub-networks (not shown).

The communication system of FIG. 19 as a whole enables connectivity between the connected UEs 1991, 1992 and host computer 1930. The connectivity can be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 can be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Example implementations, in accordance with an embodiment, of the UE, base station and host computer discussed in the preceding paragraphs will now be described with reference to FIG. 20. In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which can have storage and/or processing capabilities. In particular, processing circuitry 2018 can comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 can be operable to provide a service to a remote user, such as UE 2030 connecting via OTT connection 2050 terminating at UE 2030 and host computer 2010. In providing the service to the remote user, host application 2012 can provide user data which is transmitted using OTT connection 2050.

Communication system 2000 can also include base station 2020 provided in a telecommunication system and comprising hardware 2025 enabling it to communicate with host computer 2010 and with UE 2030. Hardware 2025 can include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 can be configured to facilitate connection 2060 to host computer 2010. Connection 2060 can be direct, or it can pass through a core network (not shown in FIG. 20) of the telecommunication system and/or through one or more intermediate networks outside the telecommunication system. In the embodiment shown, hardware 2025 of base station 2020 can also include processing circuitry 2028, which can comprise one or more programmable processors, application-specific integrated circuits, field programmable gate arrays or combinations of these (not shown) adapted to execute instructions.

Base station 2020 also includes software 2021 stored internally or accessible via an external connection. For example, software 2021 can include program instructions (also referred to as a computer program product) that, when executed by processing circuitry 2028, can configure base station 2020 to perform operations corresponding to various exemplary methods (e.g., procedures) described herein.

Communication system 2000 can also include UE 2030 already referred to, whose hardware 2035 can include radio interface 2037 configured to set up and maintain wireless connection 2070 with a base station serving a coverage area in which UE 2030 is currently located. Hardware 2035 of UE 2030 can also include processing circuitry 2038, which can comprise one or more programmable processors, application-specific integrated circuits, field programmable gate arrays or combinations of these (not shown) adapted to execute instructions.

UE 2030 also includes software 2031, which is stored in or accessible by UE 2030 and executable by processing circuitry 2038. Software 2031 includes client application 2032. Client application 2032 can be operable to provide a service to a human or non-human user via UE 2030, with the support of host computer 2010. In host computer 2010, an executing host application 2012 can communicate with the executing client application 2032 via OTT connection 2050 terminating at UE 2030 and host computer 2010. In providing the service to the user, client application 2032 can receive request data from host application 2012 and provide user data in response to the request data. OTT connection 2050 can transfer both the request data and the user data. Client application 2032 can interact with the user to generate the user data that it provides. Software 2031 can also include program instructions (also referred to as a computer program product) that, when executed by processing circuitry 2038, can configure UE 2030 to perform operations corresponding to various exemplary methods (e.g., procedures) described herein.

Figure 20:
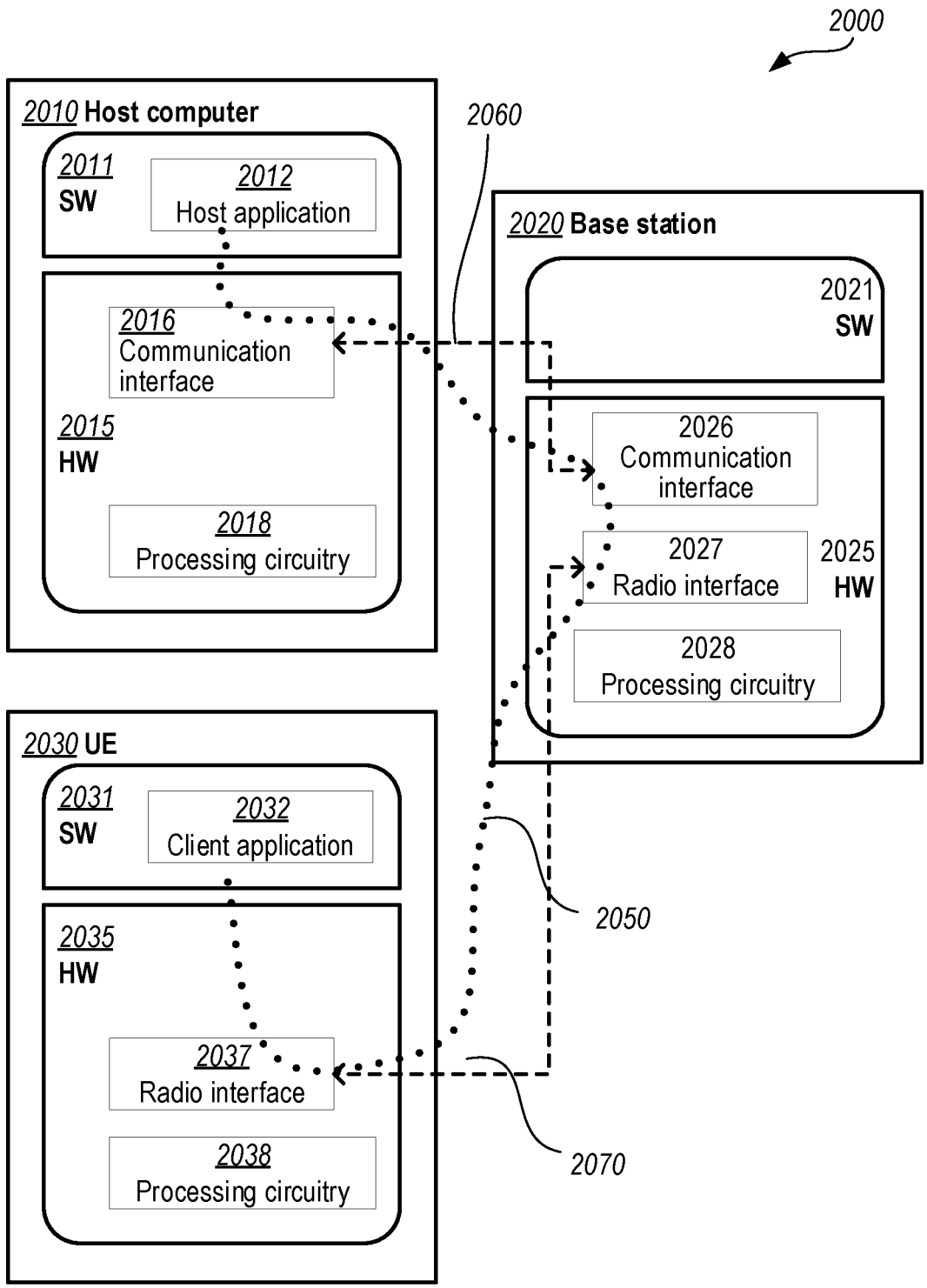

It is noted that host computer 2010, base station 2020 and UE 2030 illustrated in FIG. 20 can be similar or identical to host computer 1930, one of base stations 1912*a*, 1912*b*, 1912*c* and one of UEs 1991, 1992 of FIG. 19, respectively. This is to say, the inner workings of these entities can be as shown in FIG. 20 and independently, the surrounding network topology can be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure can determine the routing, which it can be configured to hide from UE 2030 or from the service provider operating host computer 2010, or both. While OTT connection 2050 is active, the network infrastructure can further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2050 between host computer 2010 and UE 2030, in response to variations in the measurement results. The measurement procedure and/or the network functionality for reconfiguring OTT connection 2050 can be implemented in software 2011 and hardware 2015 of host computer 2010 or in software 2031 and hardware 2035 of UE 2030, or both. In embodiments, sensors (not shown) can be deployed in or in association with communication devices through which OTT connection 2050 passes; the sensors can participate in the measurement procedure by supplying values of the monitored quantities exemplified above, or supplying values of other physical quantities from which software 2011, 2031 can compute or estimate the monitored quantities. The reconfiguring of OTT connection 2050 can include message format, retransmission settings, preferred routing etc.; the reconfiguring need not affect base station 2020, and it can be unknown or imperceptible to base station 2020. Such procedures and functionalities can be known and practiced in the art. In certain embodiments, measurements can involve proprietary UE signaling facilitating host computer 2010's measurements of throughput, propagation times, latency and the like. The measurements can be implemented in that software 2011 and 2031 causes messages to be transmitted, in particular empty or 'dummy' messages, using OTT connection 2050 while it monitors propagation times, errors etc.

FIG. 21 is a flowchart illustrating an exemplary method and/or procedure implemented in a communication system, in accordance with one embodiment. The communication system includes a host computer, a base station and a UE which, in some exemplary embodiments, can be those described with reference to FIGS. 19 and 20. For simplicity of the present disclosure, only drawing references to FIG. 21 will be included in this section. In step 2110, the host computer provides user data. In sub step 2111 (which can be optional) of step 2110, the host computer provides the user data by executing a host application. In step 2120, the host computer initiates a transmission carrying the user data to the UE. In step 2130 (which can be optional), the base station transmits to the UE the user data which was carried in the transmission that the host computer initiated, in accordance with the teachings of the embodiments described throughout this disclosure. In step 2140 (which can also be optional), the UE executes a client application associated with the host application executed by the host computer.

FIG. 22 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission can pass via the base station, in accordance with the teachings of the embodiments described throughout this disclosure. In step 2230 (which can be optional), the UE receives the user data carried in the transmission.

FIG. 23 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 23 will be included in this section. In step 2310 (which can be optional), the UE receives input data provided by the host computer. Additionally or alternatively, in step 2320, the UE provides user data. In substep 2321 (which can be optional) of step 2320, the UE provides the user data by executing a client application. In substep 2311 (which can be optional) of step 2310, the UE executes a client application which provides the user data in reaction to the received input data provided by the host computer. In providing the user data, the executed client application can further consider user input received from the user. Regardless of the specific manner in which the user data was provided, the UE initiates, in substep 2330 (which can be optional), transmission of the user data to the host computer. In step 2340 of the method, the host computer receives the user data transmitted from the UE, in accordance with the teachings of the embodiments described throughout this disclosure.

FIG. 24 is a flowchart illustrating an exemplary method and/or procedure implemented in a communication system, in accordance with one embodiment. The communication system includes a host computer, a base station and a UE which can be those described with reference to FIGS. 19 and 20. For simplicity of the present disclosure, only drawing references to FIG. 24 will be included in this section. In step 2410 (which can be optional), in accordance with the teachings of the embodiments described throughout this disclosure, the base station receives user data from the UE. In step 2420 (which can be optional), the base station initiates transmission of the received user data to the host computer. In step 2430 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method performed by a network node that is a target node candidate for conditional mobility of a user equipment (UE), the method comprising:
   receiving, from a source node serving the UE, a request to prepare a conditional mobility procedure for the UE in relation to a candidate target cell associated with the target node;
   determining if the UE can be accepted for the requested conditional mobility procedure and, if the UE can be accepted, allocating resources to support conditional mobility of the UE;
   transmitting, to the source node, a response to the received request, the response including a conditional mobility configuration and indicating that the UE can be accepted unless a cancelling message is subsequently received from the source node;
   determining that the conditional mobility configuration is no longer valid; and
   transmitting, to the source node, an indication that the conditional handover configuration is no longer valid.

2. The method of embodiment 1, further comprising starting a resource reservation timer associated with the allocated resources.

3. The method of embodiment 2, wherein determining that the conditional mobility configuration is no longer valid is based on the expiration of the resource reservation timer.

4. The method of embodiment 1, further comprising monitoring the usage of the allocated resources within the target cell.

5. The method of embodiment 2, wherein determining that the conditional mobility configuration is no longer valid is based on the detection, during the monitoring, of any of the following conditions: a resource overload condition, and a need to utilize the allocated resources for another mobility procedure.

6. The method of any of embodiments 1-5, wherein the indication that the conditional mobility configuration is no longer valid comprises a cancelling indication and a cause for the invalidity of the conditional handover configuration.

7. The method of any of embodiments 1-5, wherein the indication that the conditional mobility configuration is no longer valid further comprises an updated conditional mobility configuration for the UE.

8. The method of embodiment 7, wherein the updated conditional mobility configuration comprises one or more of the following:
   updated list of PDU session resources for the UE that are admitted by the target node;
   updated list of PDU session resources for the UE that are not admitted by the target node;

updated HandoverCommand message related to current operating conditions of the target cell; and
one or more updated conditions upon which the UE can execute the conditional mobility procedure.

9. The method of any of embodiments 1-8, wherein the conditional mobility procedure comprises one of the following: handover, resume, re-establishment, reconfiguration with synchronization, beam switch, and secondary cell (SCell) addition.

10. A method, performed by a source node, for conditional mobility of a user equipment (UE) served by the source node, the method comprising:
transmitting, to a target node, a request to prepare a conditional mobility procedure for the UE in relation to a candidate target cell associated with the target node;
receiving, from the target node, a response to the request, the response including a conditional mobility configuration and indicating that the UE can be accepted unless a cancelling message is subsequently received from the source node;
configuringCopn the UE with the conditional mobility configuration received from the target node;
receiving, from the target node, an indication that the conditional mobility configuration is no longer valid; and
reconfiguring the UE based on the indication.

11. The method of embodiment 10, wherein:
the indication that the conditional mobility configuration is no longer valid comprises a cancelling indication and a cause for the invalidity of the conditional mobility configuration; and
reconfiguring the UE based on the received indication comprises cancelling the to conditional mobility procedure.

12. The method of embodiment 10, wherein:
the indication that the conditional handover configuration further comprises an updated conditional mobility configuration for the UE; and
reconfiguring the UE based on the received indication comprises transmitting, to the UE, the updated conditional mobility configuration.

13. The method of embodiment 12, wherein the updated conditional mobility configuration comprises one or more of the following:
updated list of PDU session resources for the UE that are admitted by the target node;
updated list of PDU session resources for the UE that are not admitted by the target node;
updated HandoverCommand message related to current operating conditions of the target cell; and
one or more updated conditions upon which the UE can execute the conditional mobility procedure.

14. The method of any of embodiments 10-13, wherein the conditional mobility procedure comprises one of the following: handover, resume, re-establishment, reconfiguration with synchronization, beam switch, and secondary cell (SCell) addition.

15. A method, performed by a user equipment (UE), for conditional mobility from a source node serving the UE in a radio access network (RAN) to a target cell associated with a target node, the method comprising:
receiving, from the source node, a conditional mobility configuration associated with at least one target cell that is a candidate for a conditional mobility procedure of the UE; and
prior to determining that one or conditions for triggering the conditional mobility procedure have been met, receiving, from the source node, an indication that the conditional mobility configuration is no longer valid.

16. The method of embodiment 15, further comprising performing radio resource management (RRM) measurements to determine whether the one or more triggering conditions are met.

17. The method of any of embodiments 15-16, wherein:
the indication that the conditional mobility configuration is no longer valid comprises a cancelling indication and a cause for the invalidity of the conditional mobility configuration; and
the method further comprises cancelling the conditional mobility procedure associated with the conditional mobility configuration.

18. The method of any of embodiments 15-16, wherein:
the indication that the conditional handover configuration further comprises an updated conditional mobility configuration for the UE; and
the method further comprises reconfiguring the conditional mobility procedure based on the updated conditional mobility configuration.

19. The method of embodiment 18, wherein the updated conditional mobility configuration comprises one or more of the following:
updated list of PDU session resources for the UE that are admitted by the target node;
updated list of PDU session resources for the UE that are not admitted by the target node;
updated HandoverCommand message related to current operating conditions of the target cell; and
one or more updated conditions upon which the UE can execute the conditional mobility procedure.

20. The method of embodiment 19, further comprising upon determining that the one or more updated conditions have been met, performing the conditional mobility procedure, with respect to the target cell, based on the updated conditional mobility configuration.

21. The method of any of embodiments 15-20, wherein the conditional mobility procedure comprises one of the following: handover, resume, re-establishment, reconfiguration with synchronization, beam switch, and secondary cell (SCell) addition.

22. A network node in a radio access network (RAN), comprising:
communication circuitry configured to communicate with one or more other network nodes and one or more user equipment (UE);
processing circuitry operably coupled to the communication circuitry and configured to perform operations corresponding to any of the methods of embodiments 1-14.

23. A network node configured to support conditional mobility of user equipment (UEs) among cells in a radio access network (RAN), the network node being arranged to perform operations corresponding to any of the methods of embodiments 1-14.

24. A non-transitory, computer-readable medium storing computer-executable instructions that, when executed by processing circuitry comprising a network node in radio access network (RAN), configure the network node to perform operations corresponding to any of the methods of embodiments 1-14.

25. A user equipment (UE) configured for conditional mobility among cells in a radio access network (RAN), the UE comprising:
communication circuitry configured to communicate with one or more network nodes;

processing circuitry operably coupled to the communication circuitry and configured to perform operations corresponding to any of the methods of embodiments 15-21.

26. A user equipment (UE) configured for conditional mobility among cells in a radio access network (RAN), the UE being arranged to perform operations corresponding to any of the methods of embodiments 15-21.

27. A non-transitory, computer-readable medium storing computer-executable instructions that, when executed by processing circuitry comprising a user equipment (UE) configured for conditional mobility in radio access network (RAN), configure the UE to perform operations corresponding to any of the methods of embodiments 15-21.

28. A communication system including a host computer, the host computer comprising:
   a. processing circuitry configured to provide user data; and
   b. a communication interface configured to forward the user data to a cellular network for transmission to a user equipment (UE) through a core network (CN) and a radio access network (RAN);
   wherein:
   c. the RAN comprises first and second nodes;
   d. the first node comprises a communication transceiver and processing circuitry configured to perform operations corresponding to any of the methods of embodiments 1-9; and
   e. the second node comprises a communication transceiver and processing circuitry configured to perform operations corresponding to any of the methods of embodiments 10-14.

29. The communication system of the previous embodiment, further comprising the UE, wherein the UE is configured to perform operations corresponding to any of the methods of embodiments 15-21.

30. The communication system of any of the previous two embodiments, wherein:
   f. the processing circuitry of the host computer is configured to execute a host application, thereby providing the user data; and
   g. the UE comprises processing circuitry configured to execute a client application associated with the host application.

31. A method implemented in a communication system including a host computer, a cellular network, and a user equipment (UE), the method comprising:
   a. at the host computer, providing user data;
   b. at the host computer, initiating a transmission carrying the user data to the UE via a cellular network comprising a radio access network (RAN); and
   c. operations, performed by first and second nodes of the RAN, corresponding to any of the methods of embodiments 1-14.

32. The method of the previous embodiment, wherein the data message comprises the user data, and further comprising transmitting the user data to the UE via the first node or the second node.

33. The method of any of the previous two embodiments, wherein the user data is provided at the host computer by executing a host application, the method further comprising, at the UE, executing a client application associated with the host application.

34. The method of any of the previous three embodiments, further comprising operations, performed by the UE, corresponding to any of the methods of embodiments 15-21.

35. A communication system including a host computer comprising a communication interface configured to receive user data originating from a transmission from a user equipment (UE) via a first node or a second node in a radio access network (RAN), wherein:
   a. the first node comprises a communication interface and processing circuitry configured to perform operations corresponding to any of the methods of embodiments 1-9; and
   b. the second node comprises a communication interface and processing circuitry configured to perform operations corresponding to any of the methods of embodiments 10-14.

36. The communication system of the previous embodiment, further including the UE, wherein the UE is configured to perform operations corresponding to any of embodiments 15-21.

37. The communication system of any of the previous two embodiments, wherein:
   a. the processing circuitry of the host computer is configured to execute a host application;
   b. the UE is configured to execute a client application associated with the host application, thereby providing the user data to be received by the host computer.

The invention claimed is:

1. A method, performed by a first network node in a radio access network (RAN) for mobility of a user equipment (UE) served by a second network node in the RAN, the method comprising:
   receiving, from the second network node, a request for a mobility procedure for the UE in relation to at least one candidate target cell associated with the first network node;
   determining if the UE can be accepted for the requested mobility procedure and, if the UE can be accepted, allocating resources to support mobility of the UE;
   transmitting, to the second network node, a response that includes a configuration for the mobility procedure and that indicates the UE can be accepted unless a cancelling message is subsequently received from the second network node;
   determining that the configuration is no longer valid; and
   transmitting, to the second network node, an indication that the configuration is no longer valid, wherein the indication that the configuration is no longer valid comprises a cancelling indication and a cause why the configuration is no longer valid.

2. The method of claim 1, wherein the configuration includes one or more conditions for triggering UE execution of the mobility procedure.

3. The method of claim 1, further comprising starting a resource reservation timer associated with the allocated resources, wherein determining that the configuration is no longer valid is based on expiration of the resource reservation timer.

4. The method of claim 1, wherein determining that the configuration is no longer valid comprises:
   monitoring usage of the allocated resources; and
   detecting, during the monitoring, any of the following conditions:
      a resource overload condition, and
      a need to utilize the allocated resources for another mobility procedure.

5. The method of claim 1, wherein the indication that the configuration is no longer valid further comprises an updated configuration for the UE, and wherein the updated configuration includes one or more of the following:

updated list of PDU session resources for the UE that are admitted by the first network node;
updated list of PDU session resources for the UE that are not admitted by the first network node;

updated HandoverCommand message related to current operating conditions of the candidate target cell; and
one or more updated conditions for triggering UE execution of the mobility procedure.

6. The method of claim 1, wherein the mobility procedure comprises one of the following: handover, resume, re-establishment, reconfiguration with synchronization, beam switch, and secondary cell (SCell) addition.

7. A first network node, in a radio access network (RAN), configured for mobility of a user equipment (UE) served by a second network node in the RAN, the first network node comprising:
interface circuitry operable to communicate with the second network node and with the UE; and
processing circuitry operably coupled to the interface circuitry, whereby the processing circuitry and the interface circuitry are configured to perform operations corresponding to the method of claim 1.

8. A method, performed by a second network node in a radio access network (RAN) for mobility of a user equipment (UE) served by the second network node, the method comprising:
transmitting, to a first network node in the RAN, a request for a mobility procedure for the UE in relation to at least one candidate target cell associated with the first network node;
receiving, from the first network node, a response that includes a configuration for the mobility procedure and that indicates the UE can be accepted unless a cancelling message is subsequently received from the second network node;
transmitting the configuration to the UE;
receiving, from the first network node, an indication that the configuration is no longer valid, wherein the indication that the configuration is no longer valid comprises a cancelling indication and a cause why the configuration is no longer valid; and
reconfiguring the UE based on the indication, comprising cancelling the mobility procedure.

9. The method of claim 8, wherein the configuration includes one or more conditions for triggering UE execution of the mobility procedure.

10. The method of claim 8, wherein:
the indication that the configuration is no longer valid further comprises an updated configuration for the mobility procedure; and
reconfiguring the UE based on the received indication further comprises transmitting the updated configuration to the UE.

11. The method of claim 10, wherein the updated configuration includes one or more of the following:
updated list of PDU session resources for the UE that are admitted by the first network node;
updated list of PDU session resources for the UE that are not admitted by the first network node;
updated HandoverCommand message related to current operating conditions of the candidate target cell; and
one or more updated conditions for triggering UE execution of the mobility procedure.

12. The method of claim 8, wherein the mobility procedure comprises one of the following: handover, resume, re-establishment, reconfiguration with synchronization, beam switch, and secondary cell (SCell) addition.

13. A second network node, in a radio access network (RAN) including a first network node, configured for mobility of a user equipment (UE) served by the second network node, the second network node comprising:
interface circuitry configured to communicate with at least the first and second network nodes; and
processing circuitry operably coupled to the interface circuitry, whereby the processing circuitry and the interface circuitry are configured to perform operations corresponding to the method of claim 8.

14. A method performed by a user equipment (UE) served by a second network node in a radio access network (RAN) the method comprising:
receiving, from the second network node, a configuration for a mobility procedure in relation to at least one candidate target cell associated with a first network node in the RAN; and
before one or more conditions for triggering execution of the mobility procedure have been met, receiving from the second network node an indication that the configuration is no longer valid, wherein the indication that the configuration is no longer valid comprises a cancelling indication and a cause why the configuration is no longer valid; and
cancelling the mobility procedure associated with the configuration, based on the cancelling indication.

15. The method of claim 14, wherein the configuration includes the one or more conditions for triggering execution of the mobility procedure.

16. The method of claim 14, further comprising performing radio resource management (RRM) measurements to determine whether the one or more conditions have been met.

17. A user equipment (UE) configured for mobility in a radio access network (RAN) comprising a first network node and a second network node, the UE comprising:
interface circuitry configured to communicate with at least the first and second network nodes; and
processing circuitry operably coupled to the interface circuitry, whereby the processing circuitry and the interface circuitry are configured to perform operations corresponding to the method of claim 14.

* * * * *

UNITED STATES PATENT AND TRADEMARK OFFICE
CERTIFICATE OF CORRECTION

| | | |
|---|---|---|
| PATENT NO. | : 12,096,295 B2 | Page 1 of 3 |
| APPLICATION NO. | : 17/298779 | |
| DATED | : September 17, 2024 | |
| INVENTOR(S) | : Da Silva et al. | |

It is certified that error appears in the above-identified patent and that said Letters Patent is hereby corrected as shown below:

On the Title Page

On Page 2, in Item (56), under "OTHER PUBLICATIONS", in Column 2, Lines 30-31, delete "Feb. 26-Mar. 2, 2018, Feb. 26-Mar. 2, 2018," and insert -- Feb. 26-Mar. 2, 2018, --, therefor.

In the Drawings

In Fig. 5, Sheet 6 of 19, delete "Config" and insert -- Config. --, therefor.

In Fig. 6B, Sheet 8 of 19, delete "D escription" and insert -- Description --, therefor.

In Fig. 6B, Sheet 8 of 19, delete "available" and insert -- available. --, therefor.

In Fig. 6B, Sheet 8 of 19, delete "capabilites" and insert -- capabilities --, therefor.

In Fig. 16, Sheet 14 of 19, for Tag "1672", in Line 1, delete "Tranceiver" and insert -- Transceiver --, therefor.

In the Specification

In Column 1, Line 34, delete "(LTE" and insert -- (LTE) --, therefor.

In Column 1, Line 49, delete "on" and insert -- of --, therefor.

In Column 2, Line 62, delete "is carries" and insert -- carries --, therefor.

In Column 5, Line 33, delete "based" and insert -- based on --, therefor.

In Column 6, Line 11, delete "RRConnection-" and insert -- RRCConnection- --, therefor.

Signed and Sealed this
Twenty-second Day of April, 2025

Coke Morgan Stewart
*Acting Director of the United States Patent and Trademark Office*

CERTIFICATE OF CORRECTION (continued)
U.S. Pat. No. 12,096,295 B2

In Column 11, Line 30, delete "communicate" and insert -- communicating --, therefor.

In Column 12, Line 54, delete "such" and insert -- such as --, therefor.

In Column 13, Lines 57-63, delete "Division Multiplexing). . . . . . symbols." and insert the same at Line 56, after "Frequency" as a continuation paragraph.

In Column 13, Line 60, delete "includes of" and insert -- includes --, therefor.

In Column 14, Line 1, delete "RRConnection-" and insert -- RRCConnection- --, therefor.

In Column 14, Line 31, delete "in to" and insert -- into --, therefor.

In Column 14, Lines 35-36, delete "access management function (AMF)" and insert -- access and mobility management function (AMF) --, therefor.

In Column 16, Line 38, delete "provide" and insert -- provided --, therefor.

In Column 18, Line 6, delete "MO" and insert -- EEA0 --, therefor.

In Column 18, Line 7, delete "NIAO" and insert -- NEA0 --, therefor.

In Column 18, Line 53, delete "overlad" and insert -- overload --, therefor.

In Column 22, Line 24, delete "XnAPID" and insert -- XnAP ID --, therefor.

In Column 22, Line 27, delete "XnAPID" and insert -- XnAP ID --, therefor.

In Columns 23 & 24, in TABLE 4, under "Meaning", Line 37, delete "inconsistent.." and insert -- inconsistent. --, therefor.

In Columns 25 & 26, in TABLE 4-continued, under "Radio Network Layer cause", Line 5, delete "$TXn_{Dcoverall}$" and insert -- $TXn_{DCoverall}$ --, therefor.

In Columns 25 & 26, in TABLE 4-continued, under "Radio Network Layer cause", Line 6, delete "$TXn_{Dcprep}$" and insert -- $TXn_{DCprep}$ --, therefor.

In Columns 25 & 26, in TABLE 4-continued, under "Meaning", Line 10, delete "$TXn_{Dcoverall}$." and insert -- $TXn_{DCoverall}$. --, therefor.

In Columns 25 & 26, in TABLE 4-continued, under "Meaning", Line 11, delete "$TXn_{Dcprep}$" and insert -- $TXn_{DCprep}$. --, therefor.

In Column 25, Line 65, delete "mobility to" and insert -- mobility --, therefor.

In Column 32, Line 6, delete "units" and insert -- units. --, therefor.

CERTIFICATE OF CORRECTION (continued)
U.S. Pat. No. 12,096,295 B2

In Column 33, Lines 19-20, delete "radio front end circuitry 1690" and insert -- radio front end circuitry 1692 --, therefor.

In Column 34, Lines 27-28, delete "mobile-type communication" and insert -- machine-type communication --, therefor.

In Column 34, Line 47, delete "etc.) personal" and insert -- etc.), personal --, therefor.

In Column 35, Line 16, delete "Radio front end circuitry 1614" and insert -- Radio front end circuitry 1612 --, therefor.

In Column 38, Line 9, delete "interchangeable." and insert -- interchangeably. --, therefor.

In Column 41, Line 30, delete "memory 1890. Memory 1890" and insert -- memory 1890-1. Memory 1890-1 --, therefor.

In Column 45, Line 66, delete "sub step" and insert -- substep --, therefor.

In Column 47, Line 39, delete "according" and insert -- according to --, therefor.

In Column 49, Line 21, delete "configuringCopn" and insert -- configuring --, therefor.

In Column 49, Line 33, delete "the to" and insert -- the --, therefor.